United States Patent
Moore et al.

(10) Patent No.: US 11,615,497 B2
(45) Date of Patent: Mar. 28, 2023

(54) MANAGING OPTIMIZATION OF A NETWORK FLOW

(71) Applicant: ProvisionAI, LLC, Franklin, TN (US)

(72) Inventors: Thomas Moore, Franklin, TN (US); Jeffrey H. Schutt, Santa Rosa, CA (US); Robert F. Schneider, San Antonio, TX (US); Keith D. Moore, Leander, TX (US)

(73) Assignee: ProvisionAI, LLC, Franklin, TN (US)

( * ) Notice: Subject to any disclaimer, the term of this patent is extended or adjusted under 35 U.S.C. 154(b) by 0 days.

(21) Appl. No.: 17/179,219

(22) Filed: Feb. 18, 2021

(65) Prior Publication Data

US 2021/0279831 A1 Sep. 9, 2021

Related U.S. Application Data

(60) Provisional application No. 62/985,302, filed on Mar. 4, 2020.

(51) Int. Cl.
*G06Q 50/28* (2012.01)
*G06Q 10/067* (2023.01)
*G06Q 10/0631* (2023.01)

(52) U.S. Cl.
CPC .......... *G06Q 50/28* (2013.01); *G06Q 10/067* (2013.01); *G06Q 10/06315* (2013.01)

(58) Field of Classification Search
CPC . G06Q 50/28; G06Q 10/06315; G06Q 10/067
See application file for complete search history.

(56) References Cited

U.S. PATENT DOCUMENTS

| 7,668,761 B2 * | 2/2010 | Jenkins ................ G06Q 10/087 705/28 |
| 10,360,522 B1 * | 7/2019 | Leonard .......... G06Q 10/06315 |

(Continued)

FOREIGN PATENT DOCUMENTS

WO WO-2020014725 A2 * 1/2020 .............. B60P 3/007

OTHER PUBLICATIONS

He, Zhenggang, Jingni Guo, and Ruixue Li. Internet-Based Vehicle-Cargo Matching Platform Enterprises in China. working paper derived from: https://hosei. repo. nii. ac. jp, 2017. (Year: 2017).*

(Continued)

*Primary Examiner* — Patricia H Munson
*Assistant Examiner* — Hamzeh Obaid
(74) *Attorney, Agent, or Firm* — Paul S. Drake

(57) ABSTRACT

A method, system and/or computer usable program product for managing optimization of a transportation network system including identifying a set of items for transportation between a set of origins and a set of destinations during a set of time periods, prioritizing each of the set of items, utilizing a set of network constraints and costs, utilizing a set of loading constraints for a set of transportation units, the loading constraints limiting the quantity and placement of items for each transportation unit, optimizing a quantity of the set of transportation units for transporting the set of items between the set of origins and the set of destinations during the set of time periods based on the prioritization of each of the set of items, the network constraints and costs, and the loading constraints for each transportation unit, and adjusting the optimized quantity of transportation units to a discrete quantity based on the prioritization of each of the set of items and the network constraints and costs.

24 Claims, 16 Drawing Sheets

(56) References Cited

U.S. PATENT DOCUMENTS

| | | | | |
|---|---|---|---|---|
| 10,867,309 | B1* | 12/2020 | Wang | G06Q 30/0202 |
| 2010/0332273 | A1* | 12/2010 | Balasu | G06Q 50/28 |
| | | | | 705/332 |
| 2012/0253862 | A1* | 10/2012 | Davidson | G06Q 10/06398 |
| | | | | 705/7.11 |
| 2018/0046964 | A1* | 2/2018 | Leoni | G06Q 10/06315 |
| 2018/0247266 | A1* | 8/2018 | Knapp | G06Q 10/08355 |
| 2019/0043006 | A1* | 2/2019 | Walton | G06Q 10/083 |
| 2019/0295204 | A1* | 9/2019 | Putcha | G06Q 50/30 |
| 2020/0134762 | A1* | 4/2020 | Chen | G06Q 50/28 |
| 2020/0273133 | A1 | 8/2020 | Morris | |
| 2020/0342560 | A1* | 10/2020 | Kishikawa | G06Q 50/28 |
| 2020/0364630 | A1* | 11/2020 | Bhave | G06Q 10/087 |
| 2020/0364641 | A1* | 11/2020 | Luedke | G06Q 10/08345 |
| 2021/0081904 | A1* | 3/2021 | Song | G06Q 10/063116 |

OTHER PUBLICATIONS

He, Zhenggang, Jingni Guo, and Ruixue Li. Internet-Based Vehicle-Cargo Matching Platform Enterprises in China. working paper derived from: https://hosei. repo. nii. ac. jp, 2017. (Year: 2017) (Year: 2017).*

* cited by examiner

900

| Time Period (902) | Item (904) | Quantity (905) | Lane (906) | Mode (908) |
|---|---|---|---|---|
| 1 | X | 3 | 01-D1 | Truck |
| 1 | Y | 2 | 01-D1 | Truck |
| 2 | X | 6 | 01-D1 | Rail Car |
| ... | ... | ... | ... | ... |
| 14 | Y | 2 | 04-D6 | Truck |
| 14 | Z | 3 | 04-D7 | Truck |

| Location (912) | Item (914) | Current Inventory (916) | Safety Stock (917) | Supply / Demand (918) |
|---|---|---|---|---|
| 01 | X | 12 | 10 | 4 |
| 01 | Y | 6 | 3 | 2 |
| 01 | Z | 8 | 7 | 1 |
| 02 | X | 10 | 8 | 1 |
| ... | ... | ... | ... | ... |
| D7 | Y | 5 | 2 | 2 |
| D7 | Z | 9 | 6 | 1 |

FIG. 9B

| Index 921 | Item ID 922 | Time Period 923 | Lane 924 | Mode 925 | Quantity Shipped 926 | Priority 928 | Loaded Indicator 929 |
|---|---|---|---|---|---|---|---|
| 1 | X | 3 | 01-D1 | Truck | 3 | 400 | Yes |
| 1 | Y | 2 | 01-D1 | Truck | 2 | 326 | Yes |
| 2 | Z | 3 | 01-D1 | Rail | 6 | 201 | No |
| ... | ... | ... | ... | ... | ... | ... | ... |
| 14 | Z | 3 | 04-D7 | Truck | 3 | 395 | No |

| Lane 932 | Mode 933 | Time Period 934 | Rec. # Trans. 936 | Round ↓ # Trans. 937A | Round ↑ # Trans. 937B | Final # Trans. 938 |
|---|---|---|---|---|---|---|
| 1 | Truck | 1 | 3.6 | 3 | 4 | 3 |
| 1 | Rail | 1 | 1.2 | 1 | 2 | 1 |
| 2 | Truck | 2 | 5.2 | 5 | 6 | 6 |
| ... | ... | ... | ... | ... | ... | ... |
| 6 | Truck | 14 | 4.3 | 4 | 5 | 5 |

MANAGING OPTIMIZATION OF A NETWORK FLOW

PRIORITY CLAIM

This application claims priority to U.S. Provisional Application No. 62/985,302, filed Mar. 4, 2020, entitled "MANAGING OPTIMIZATION OF A NETWORK FLOW", the disclosure of which is incorporated in its entirety herein by reference.

BACKGROUND

Technical Field

The present invention relates generally to managing optimization of a network flow, and more specifically to a computer implemented method for balancing and smoothing network flow through a transportation network system to increase overall efficiency over multiple time periods.

Description of Related Art

As network systems become more complex, network optimization becomes increasingly complex as well. Each network system includes certain limitations and other constraints that can affect the performance of the network system. In addition to addressing constraints of the network system, there are many variables that may be difficult to predict such as traffic demand. Furthermore, there may be many multiple performance objectives to be met concurrently. This can include a variety of metrics such as throughput, latency, bandwidth usage, etc. These metrics may be negatively correlated. That is, modifying conditions to improve one metric may negatively impact another metric. It is these and other complexities that make network optimization a complex and difficult task.

Supply chain networks may have similar complexities with constraints, variables, metrics, and performance objectives. In addition, supply chain networks may have greater variability and unpredictability over time. That is, traffic on those supply chain networks may vary significantly on a daily basis due to changing conditions outside the supply chain network. For example, climatic changes can affect a variety of factors such as highly variable demands for certain items at certain destinations. For another example, labor disruptions at a transportation provider can rapidly affect the availability of transportation units at certain transportation origins. As a result, optimizing network flow through such variable network systems is also increasingly a complex and difficult task.

Broadly speaking, supply chain management is the management of the flow of goods and services from processing raw materials to providing final products to customers. There are many organizations that utilize a variety of supply chain management tools, either developed internally or acquired from third party vendors. For example, Amazon.com Inc. and Walmart Inc. are very large organizations known for their supply chain management expertise that provide a competitive advantage in the marketplace. In addition, a variety of third party vendors, including SAP SE, Infor Inc., Gartner Inc., Kinaxis Inc., Logility Inc., Bluecrux CVBA, E2open LLC, o9 Solutions Inc., Transportation-|Warehouse Optimization (T|WO), etc. have developed a variety of software tools for managing supply chains. These tools range from accounting systems for tracking the supply chain assets and expenses to planning tools for managing the shipments of goods. Example products are SAP APO (Advanced Planner and Optimizer), Kinaxis RapidResponse and the T|WO AutoO2 and AutoCDO software tools.

SAP APO is a supply chain planning tool with four modules including DP (Demand Planning), SNP (Supply Network Planning), PP/DS (Production Planning and Detail Scheduling), and GATP (Global Available to Promise). Essentially, SAP APO estimates upcoming demand for a variety of goods with the DP module; determines if the goods are available in the quantities and time to meet the estimated demand (e.g., in inventory) in the GATP module; generates procurement proposals to obtain or produce additional goods to meet the estimated demand with the PP/DS module; then ensures that the goods are produced and transported in sufficient quantities and time to meet the estimated demand with the SNP module. That is, SAP APO is utilized to forecast demand and take the steps necessary through production, acquisition and shipping to ensure that demand is met.

Kinaxis RapidResponse is a supply chain planning software platform for monitoring and responding to demand and distribution requirements for an organization. It includes several configurable applications including sales and operations planning, demand planning, supply planning, inventory planning and capacity planning that are interconnected for managing the supply chain for the organization. The RapidResponse platform makes an array of supply chain applications accessible through a common user interface. RapidResponse supply planning provides users end-to-end supply visibility of the supply chain and the agility to act on changing conditions. Rapid Response supply planning also analyzes risk parts of a supply chain plan, or areas where the supply plan is unobtainable due to material or capacity constraints.

T|WO has supply chain management software tools for single-site deployment planning including truck loading and constrained dock optimization. For example, T|WO AutoO2 takes demand information (e.g., customer orders) regarding goods needing shipment from a first location to a second location (e.g., from a plant to a warehouse) and identifies truckload shipments to meet that demand. This includes order consolidation to mix and merge goods from multiple orders onto a minimum number of trucks traveling between the first and second locations. This process includes determining truck loading of goods using product size, product weight, stacking requirements, and shipping constraints such as truck volume and axle weight limits to make sure that trucks or other shipping types are properly loaded within those constraints. Furthermore, picking instructions can be provided for efficient picking of the goods to be loaded onto each pallet of goods to be loaded onto each truck. For another example, T|WO AutoCDO handles constrained dock limitations, such as where there is limited dock space and goods are being produced for loading onto trucks as those goods are produced (i.e., limited staging space for storing and packing goods prior to loading them onto trucks). This software planning tool takes into account expected production, expected truck/trailer availability, freight costs, storage constraints, etc. to determine where to load goods onto pallets for loading onto each truck.

SUMMARY

The illustrative embodiments of the present invention provide a method, system, and/or computer usable program product for managing optimization of a transportation network system including identifying a set of items for transportation between a set of origins and a set of destinations during a set of time periods, prioritizing each of the set of items, utilizing a set of network constraints and costs, utilizing a set of loading constraints for a set of transportation units, the loading constraints limiting the quantity and placement of items for each transportation unit, optimizing a quantity of the set of transportation units for transporting the set of items between the set of origins and the set of destinations during the set of time periods based on the prioritization of each of the set of items, the network constraints and costs, and the loading constraints for each transportation unit, and adjusting the optimized quantity of transportation units to a discrete quantity based on the prioritization of each of the set of items and the network constraints and costs.

BRIEF DESCRIPTION OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 9A-9H provide block diagrams of various data structures utilized by the optimization system for managing the optimization of the network flow in which various embodiments of the present disclosure may be implemented.

DETAILED DESCRIPTION

Processes and devices may be implemented and utilized for managing optimization of a network flow. These processes and apparatuses may be implemented and utilized as will be explained with reference to the various embodiments below.

Figure 1:
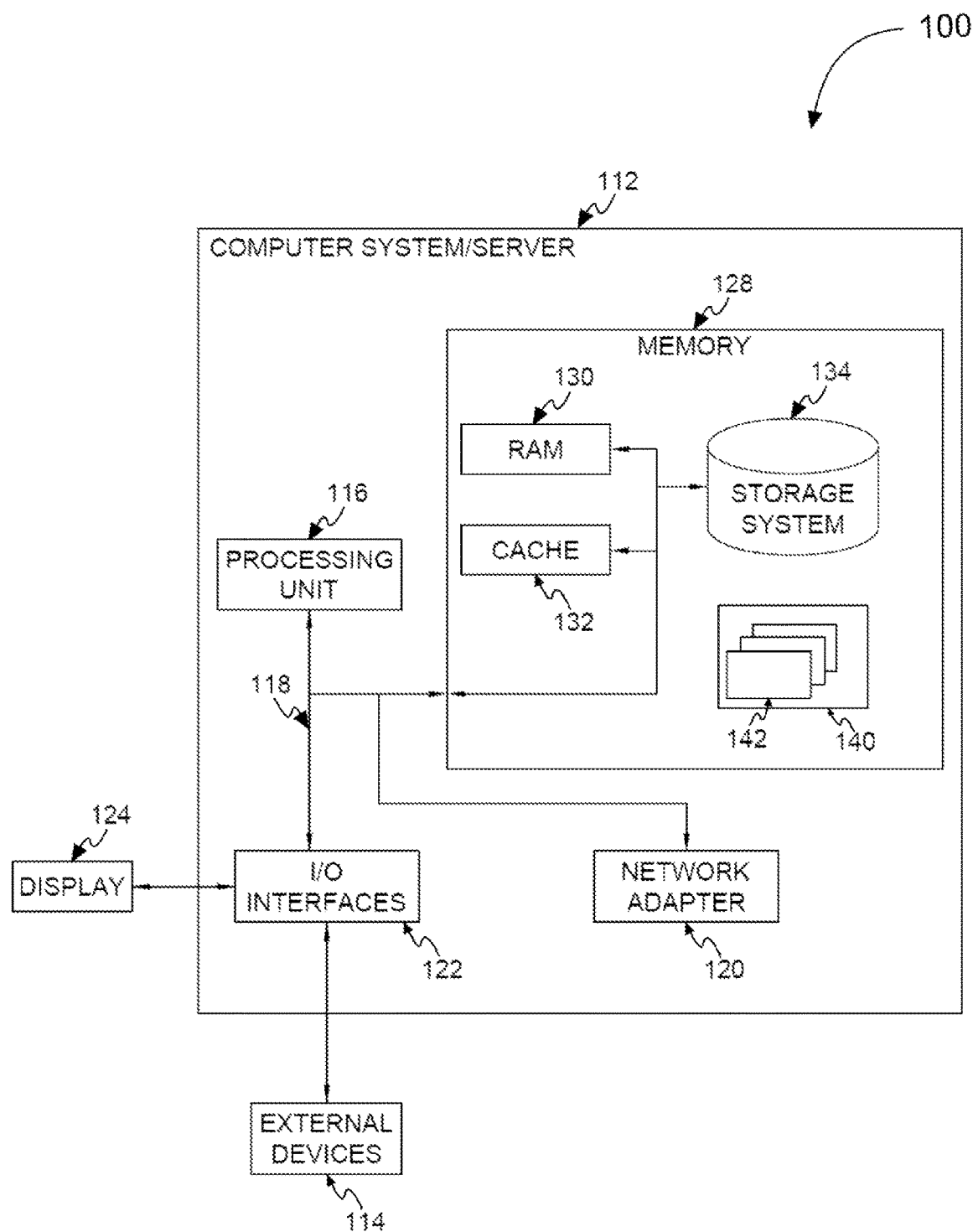
FIG. 1 provides a block diagram of an illustrative data processing system in which various embodiments of the present disclosure may be implemented.

FIG. 1 provides a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing optimization of a network flow.

In data processing system 100 there is a computer system/server 112, which is operational with numerous other computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-performable instructions, such as program modules, being processed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices. For example, the present invention may be implemented in a cloud computing environment, distributed or otherwise, which may be virtualized such as with the use of a hypervisor managing multiple nodes including virtual processors, virtual memory, etc.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing optimization of a network flow.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
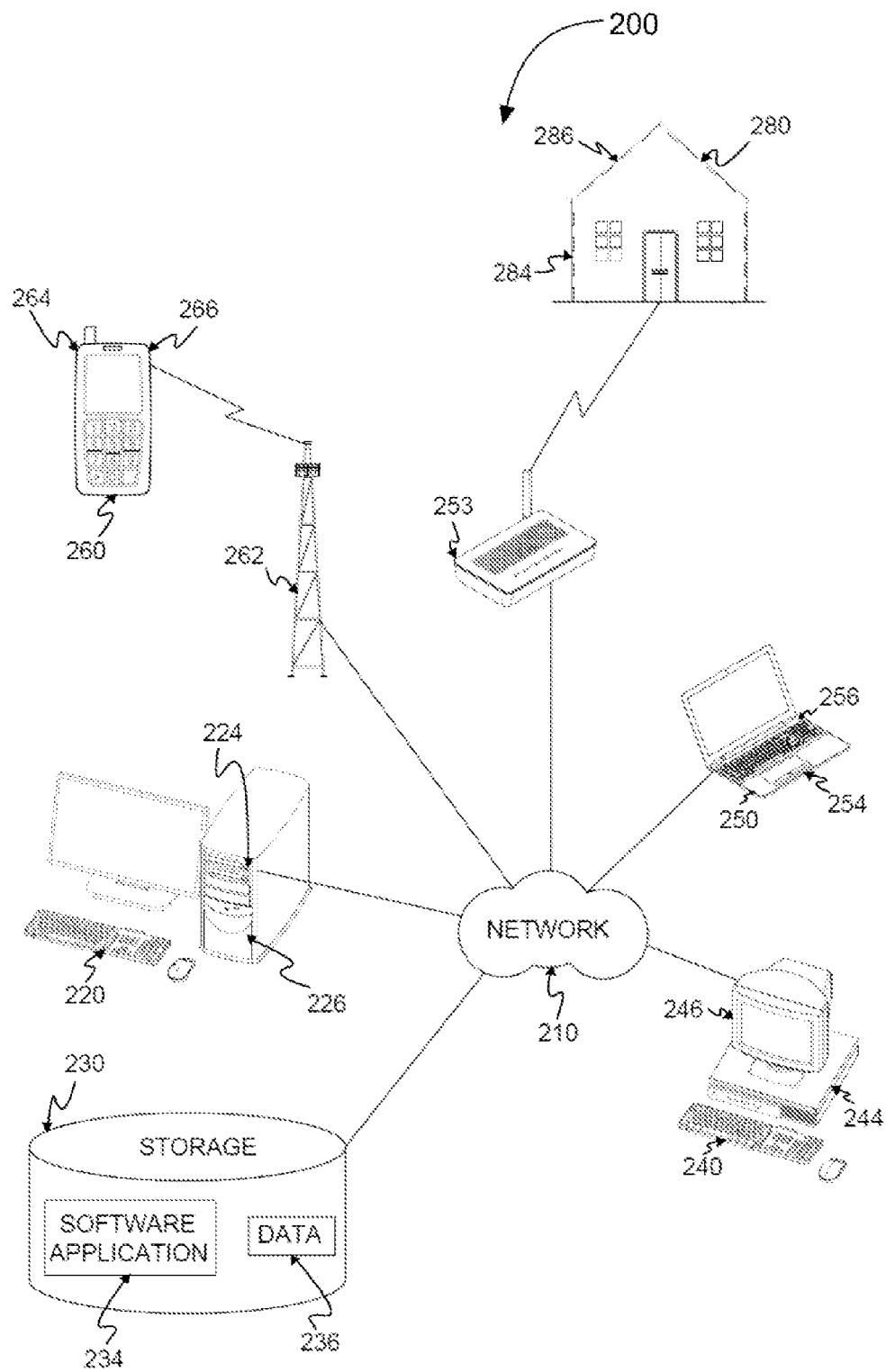
FIG. 2 provides a block diagram of an illustrative network of data processing systems in which various embodiments of the present disclosure may be implemented.

FIG. 2 provides a block diagram of an illustrative network of data processing systems in which various embodiments of the present disclosure may be implemented. Data processing environment 200 is a network of data processing systems such as described above with reference to FIG. 1. Software applications such as for managing optimization of a network flow may be processed on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile device 260 such as a mobile phone may be coupled to network 210 through a cell tower 262. Data processing systems, such as server 220, client 240, laptop 250, mobile device 260 and facility 280 contain data and have software applications including software tools processing thereon. Other types of data processing systems such as personal digital assistants (PDAs), smartphones, tablets and netbooks may be coupled to network 210.

Server 220 may include software application 224 and data 226 for managing optimization of a network flow or other software applications and data in accordance with embodiments described herein. Storage 230 may contain software application 234 and a content source such as data 236 for managing optimization of a network flow. Other software and content may be stored on storage 230 for sharing among various computer or other data processing devices. Client 240 may include software application 244 and data 246. Laptop 250 and mobile device 260 may also include software applications 254 and 264 and data 256 and 266. Facility 280 may include software applications 284 and data 286 on local data processing equipment. Other types of data processing systems coupled to network 210 may also include software applications. Software applications could include a web browser, email, or other software application for managing optimization of a network flow.

Server 220, storage unit 230, client 240, laptop 250, mobile device 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile device 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
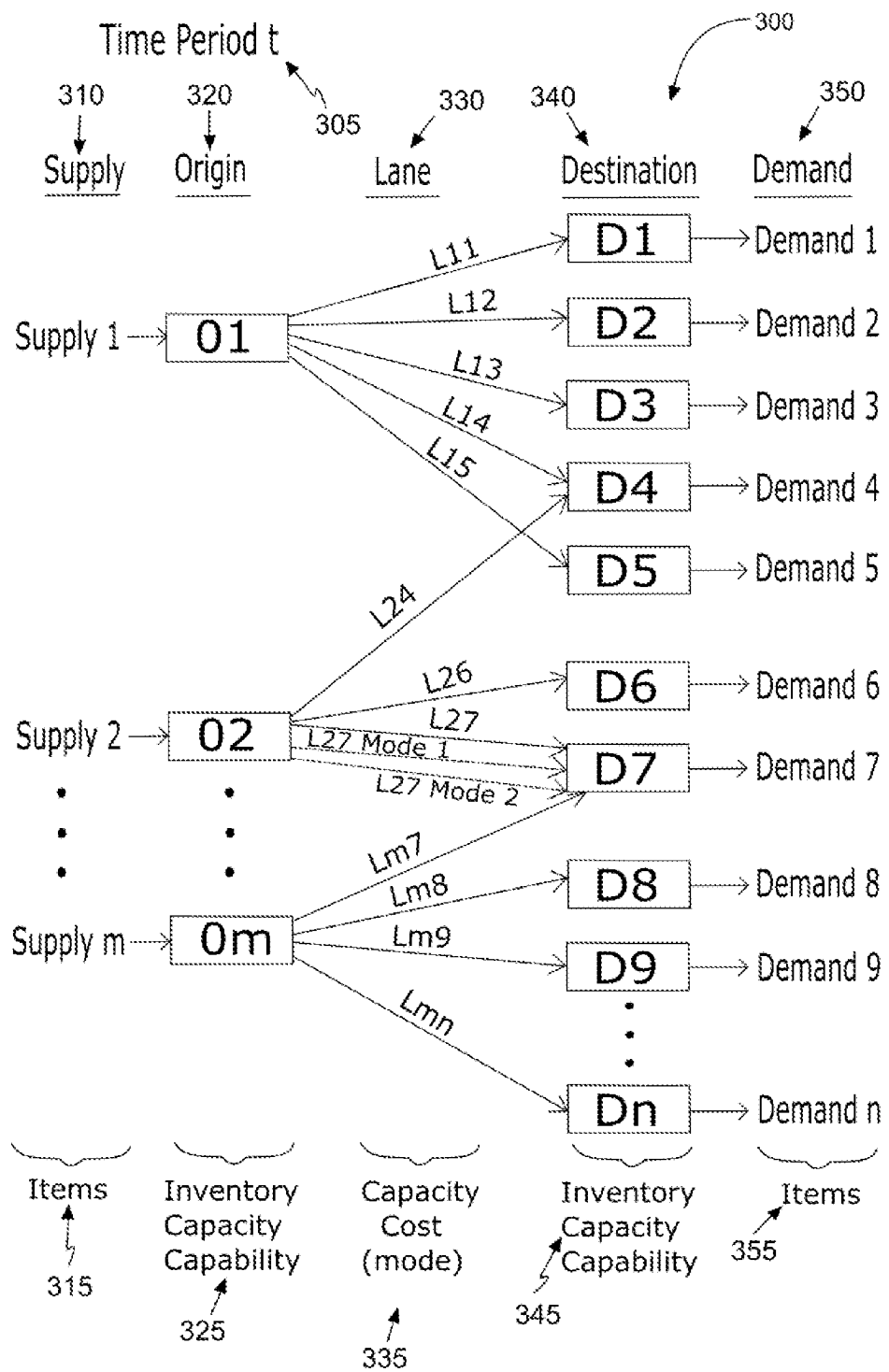
FIG. 3 provides a high level block diagram of a general network system for optimization in which various embodiments of the present disclosure may be implemented.

FIG. 3 provides a high level block diagram of a general network system 300 for optimization, in which various embodiments of the present disclosure may be implemented. In the present embodiment of this network system, items are supplied 310 to a set of origins 320 which are transported across multiple lanes 330 to a set of destinations 340 to meet item demand 350 for multiple time periods t 305. This combination of supply, origin, lane, destination and demand of items may be referred to collectively as a supply chain network system with a network flow of transportation units and items throughout the network system. In the present embodiment, a time period may typically be a day with the present network flow optimized across multiple time periods such as 7-21 days. Of course, alternative time periods 305 may be utilized such as work shift, semi-daily, or even shorter or longer time periods such as weekly.

Origins 320 are shown as O1, O2, etc., up to Om. Each origin is supplied with a variety of items 315 each time period t. Each supply 310 of items 315 is shown as Supply1, Supply2, etc., up to Supplym corresponding to the associated origin 320. Each origin may include a set of constraints and capabilities 325 including an inventory of items, a capacity for storing such items, and a capability to ship items across lanes 330 each time period. Lanes 330 are shown as Lmn where m is the origin 320 and n is the destination 340. Each lane may include a set of constraints and capabilities 335 for each time period t including a capacity of transportation units and a cost per transportation unit which can vary based on the number of transportation units utilized for that lane. In the present embodiment, origin O1 has at least five lanes to at least five destinations (D1-D5), origin O2 has three lanes to four destinations (D4 and D6-D7), and origin Om has at least four lanes to at least four destinations (D7-Dn).

In the case of origin O2 to destination D7, shown as lane L27, two alternative lanes L27 mode 1 and L27 mode 2 are shown as dotted arrows, each with a different transportation mode. These modes can include different types of transportation modes such as a truck and a train, or as a refrigerated truck and a flatbed truck. These different transportation modes may each come with different capacities, costs and speed (e.g., latency). When a lane is shown with multiple modes (e.g., L27 mode 1 and L27 mode 2), that combination of lane and mode may be referred to as a lane-mode. In some embodiments, all transportation between origins and destinations may be shown as lane-modes.

Destinations 340 are shown as Dn where n is the destination 340 fulfilling Demandn. Each destination provides (i.e., stocks, stores, supplies, etc.) a variety of items 355 each time period t to meet downstream demand. Each demand 350 of items 355 is shown as Demand1, Demand2, etc., up to Demandn corresponding to the associated destination 340. Each destination may include a set of constraints and capabilities 345 including an inventory of items, a capacity for storing such items, and a capability to receive items across lanes 330 each time period.

In the present embodiment, the units utilized by supply 310, origin 320, destination 340 and demand 350 may be in units of items, which may be pallets of items. On the other hand, the units utilized by lane 330 may be in transportation units such as trucks or railway cars for transporting items from an origin to a destination across a lane. These units are utilized to optimize the network flow across multiple time periods as described above.

In the present embodiment, there are two time periods of particular significance for the present embodiment. The first is a time period for committing to a set of transportation units across a set of lanes, referred to herein as transportation unit commit or unit commit. Any transportation units that have been committed for a given lane and/or lane mode are referred to herein as committed transportation committed units. Transportation unit commit may typically be three or four days in the future in the present example. Some transportation units may be committed on different days. For example, one transportation unit for one lane and/or lane mode may be committed on day 3 and another transportation unit may be committed for a different lane and/or lane mode on day 4. The second significant time period is a time period for committing a set of items to be shipped on the committed set of transportation units, referred to herein as item commit. Any items that have been committed are referred to herein as committed items. Item commit may typically be 1 or 2 days in the future in the present example. Some units may be committed on different days. That is, some items may be committed for a committed unit on day 1 and other items may be committed for a different committed unit on day 2, while other items may not be committed yet for committed units on either day. As will be described herein, these commitments may be affected by planned or projected shipments on the time periods preceding and succeeding the aforementioned commitment time periods.

The present embodiment is shown with some common destinations 340 for multiple origins 320. Alternative embodiments could include lanes from each origin to every destination. In addition, the destinations for each origin could vary over time. For example, a given destination may be supplied by origin O1 during time period t and then supplied by origin O2 for time period t+1. This could be shown as lanes from each origin to the destination across multiple time periods, but with the lanes set to zero capacity for certain time periods. As one or ordinary skill of the art can appreciate, other alternative embodiments may be utilized for different configurations of origins, lanes and destinations.

Figure 4:
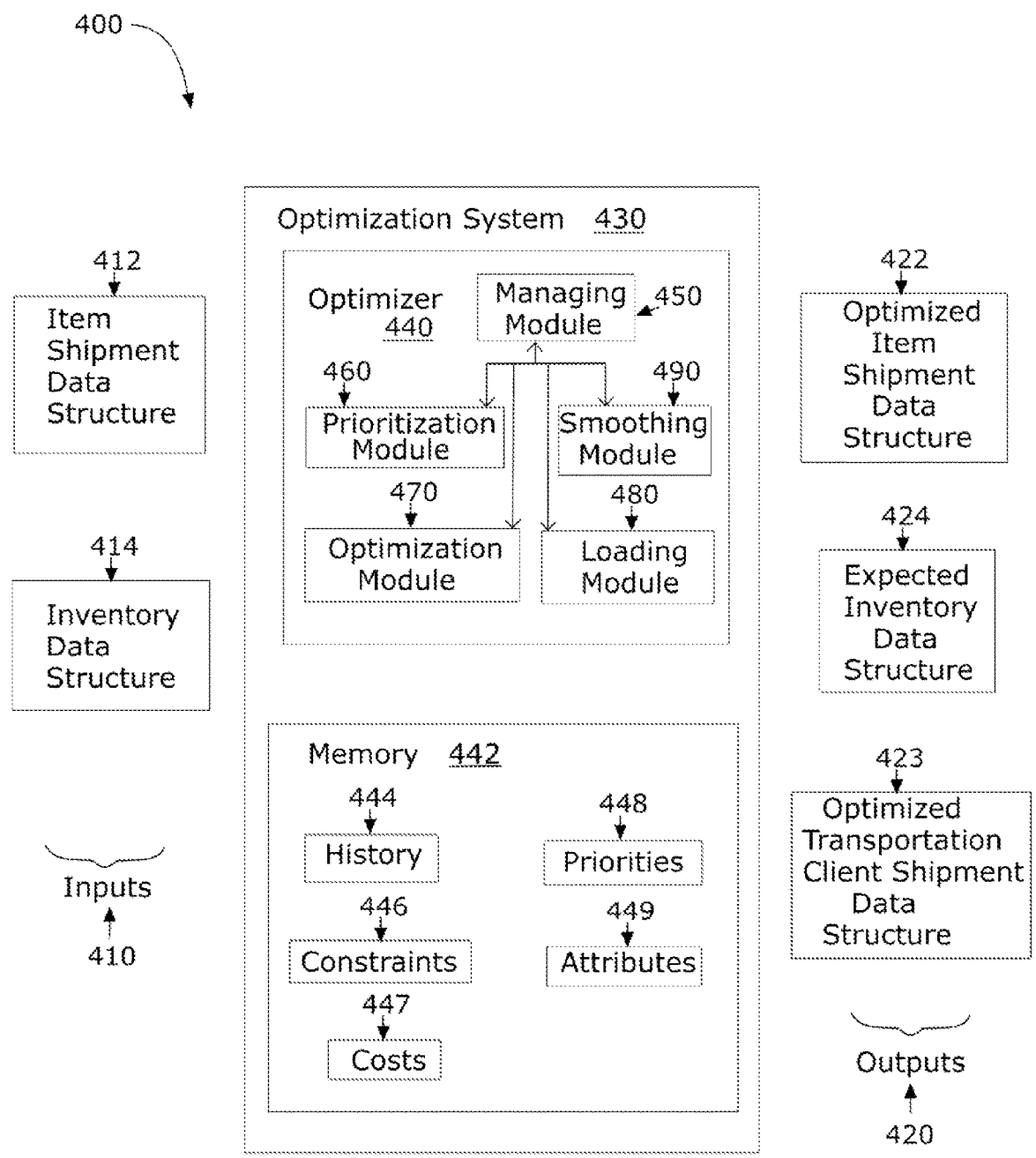
FIG. 4 provides a high level block diagram of a data processing system utilizing an optimization system for managing an optimization of a network flow in which various embodiments of the present disclosure may be implemented.

FIG. 4 provides a high level block diagram of data processing system 400 utilizing an optimization system 430 for managing optimization of the network flow in which various embodiments of the present disclosure may be implemented. This may be accomplished through balancing and smoothing demand fluctuations within shipping and storage constraints while maintaining adequate inventories for item availability. An example of the results of this balancing and smoothing process, for a single transportation lane between an origin location and a destination location, is described below with reference to FIG. 7. This process can be repeated periodically, such as daily, for multiple time periods, transportation lanes, and modes of transportation units. That is, optimization system 430 optimizes (i.e., solves) the network flow across multiple time periods, lanes and modes, which can be repeated on a periodic basis when there are new inputs 410 to be utilized for optimization. For ease of explanation, each time period will be described below as a day, although other time periods may be utilized. In addition, item quantities shall be described below in pallets, although other forms of quantities can be utilized including volume, weight, etc. FIG. 4 will be described below with some references to FIG. 3.

In the present embodiment, optimization system 430 has two primary inputs 410, including an item shipment data structure 412 and an inventory data structure 414, as well as three primary outputs 420 including an optimized item shipment data structure 422, optimized transportation unit shipment data structure 423, and an expected inventory data structure 424. Although the inputs and outputs are described as data structures, they may represent input databases that may be queried or input files of data provided from one or more sources for providing selected information to the optimization system, and the outputs may represent output databases that may be generated or output files of data provided by the optimization system for use as needed for optimizing the shipment of items between origins and destinations. Inputs 410 may be provided by or acquired from an enterprise software solution, by specialized software for managing inventory across a distribution network, or even by a human expert with experience for a given network flow. Outputs 420 may be provided back to the enterprise software solution or to a set of users through other systems and user interfaces.

Item shipment data structure 412 includes a list of items scheduled to be shipped by day across lanes and modes (type of transportation unit). An example of item shipment data structure 412 is described below with reference to FIG. 9A. Inventory data structure 414 includes a current inventory and safety stock of items at each origin and destination including supplies to and demand from those inventories. An example of inventory data structure 414 is described below with reference to FIG. 9B. Optimized item shipment data structure 422 includes an optimized list of items scheduled to be shipped by day across lanes and modes (type of transportation unit). An example of optimized item shipment data structure 422 is described below with reference to FIG. 9F. Optimized transportation unit shipment data structure 423 includes an optimized list of transportation units utilized for shipping items for each time period, lane and mode. An example of an optimized transportation unit shipment data structure 423 is described below with reference to FIG. 9G. Expected inventory data structure 424 includes an expected inventory of items at each origin and destination at certain future time periods based on the effects of optimized item shipment data structure 422 and optimized transportation unit shipment data structure 423. An example of expected inventory data structure 424 is described below with reference to FIG. 9H.

Optimization system 430 includes an optimizer 440 and a memory 442. Memory 442 includes information stored for utilization by the optimizer 440 including history 444, constraints 446, costs 447, priorities 448, and attributes 449. History 444 includes historical data and derivatives thereof which may be utilized for a variety of purposes such as described herein. Constraints 446 include a variety of constraints that can limit optimization of scheduled item shipments. Constraints 446 can include loading limitations at each origin and unloading limitations at each destination as well as shipping limitations and requirements for various lanes and modes. Costs 447 includes fixed and variable costs that can affect optimization of scheduled item shipments. These fixed and variable costs can include shipping, loading and unloading costs by origin, destination, lane and mode. Priorities 448 include the projected day of departure for a given item, current inventory of that item at the origin and destination, expected supply and demand of that item, and the relative inventory status of that item given safety stock requirements. Also, certain items may be given a higher or lower priority based on customer requirements. Attributes 449 can include the attributes of items and requirements of transportation units. Item attributes may include pallet size, weight, crushability, etc. of items and may be accessed for use in this simulated loading. Transportation unit attributes may include certain weight, volume and balancing requirements which may affect simulated packing of those transportation units. Alternative embodiments can utilize other types of constraints, costs, priorities and attributes. History 444, constraints 446, costs 447, priorities 448 and attributes 449 are shown in memory as they may generally be consistent over time and may be modified by a user through a user interface for that purpose. However, if they may vary over time, this information may be provided to optimization system 430 as an input.

Optimizer 440 includes a managing module 450, a prioritization module 460, an optimization module 470, a loading module 480 and a smoothing module 490. Optimizer 440 may include a processor that includes instructions for various modules for execution, thereby providing a special purpose computer for performing the functions of the present invention. Managing module 450 manages the overall operations of optimizer 440 including the operations and interactions of prioritization module 460, optimization module 470, loading module 480 and smoothing module 490. Prioritization module 460 prioritizes items to be shipped based on various criteria, such as priorities 448, which can be customized for a given network flow. Prioritization module 460 may only be utilized for a single prioritization of the items for each solve performed by optimization system 430. Optimization module 470 optimizes a set of shipments across lanes 330 for each time period. This optimization is generated based on the inventory of and supply to origins 320, the inventory of and demand from destinations 340, loading and unloading capacities of origins and destinations, item prioritization from prioritization module 460, and costs associated with shipping across lanes 330. The information needed for this optimization may be found in inputs 410 and memory 442. This optimization may be performed utilizing a network linear programming model or other optimization techniques. Loading module 480 determines how a set of transportation units may be loaded with items. In this embodiment, the loading module does not need to know which day or lane that the set of transportation units are being loaded, the loading module just simulates the loading of transportation units with a set of items as may be requested. Alternative embodiments may concurrently simulate the loading of multiple types of transportation units, across multiple lanes, or even across multiple days. Smoothing module 490 includes the smoothing of shipments across lanes, modes and time periods is generated to improve overall efficiency of the network flow to reduce overall costs while maintaining on-time deliveries. This includes loading, transportation and unloading costs.

Alternative embodiments may utilize other types of modules or implementations to accomplish the same or similar results. For example, a managing module may not be needed if the other modules are tightly coupled. In addition, alternative embodiments may utilize different inputs, outputs and information stored in memory for a given implementation or application for a customer. For example, the criteria for prioritization may vary for different implementation or the criteria may be user modifiable within a given implementation as desired by that customer.

Figure 5:
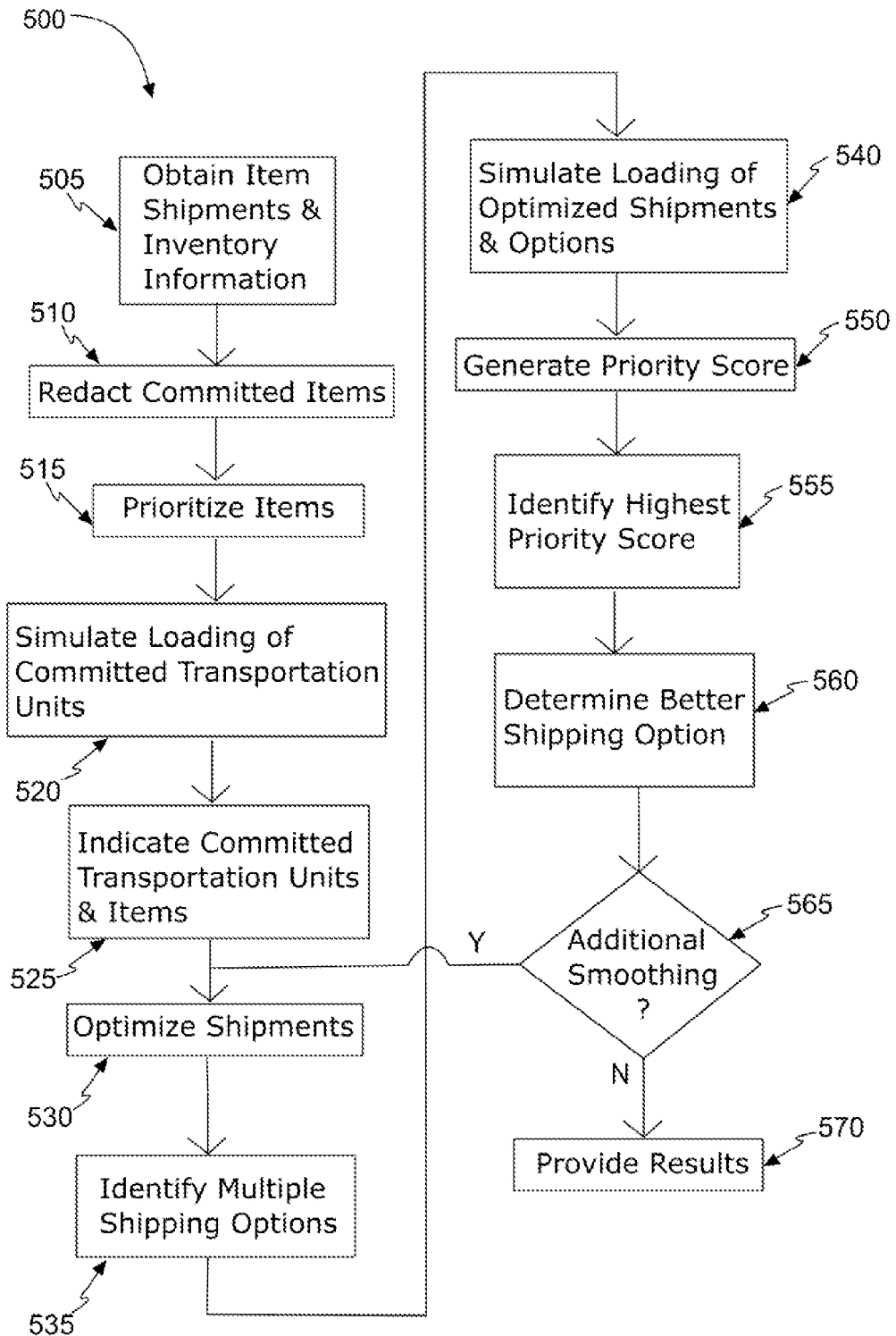
FIG. 5 provides a high level flow diagram of the optimization system, including the managing module, managing optimization of a network flow in which various embodiments of the present disclosure may be implemented.

FIG. 5 provides a high level flow diagram 500 of optimization system 430, including managing module 450, managing optimization of a network flow in which various embodiments of the present disclosure may be implemented. This optimization may be accomplished through balancing and smoothing demand fluctuations within shipping and storage constraints while maintaining adequate inventories for item availability across the network. An example of the results of this balancing and smoothing process, for a single transportation lane between an origin location and a destination location, is described below with reference to FIG. 7. This process can be repeated for each day or other selected time period. For ease of explanation, each time period may be described herein as a day, although other time periods may be utilized. In addition, item quantities may be described herein in pallets, although other forms of quantities can be utilized including volume, weight, etc. FIG. 5 will be described below with some references to FIGS. 3 and 4.

In a first step 505, managing module 450 obtains inputs 410 including item shipment data structure 412 and inventory data structure 414. Item shipment data structure 412 includes a list of items and item quantities for shipment across lanes 330 by transportation mode for multiple time periods 305. Each item may have a unique identifier, also referred to herein as an item identifier, such as a SKU (stocking unit). This item identifier may be utilized to look up certain attributes and other information about the item. An example of item shipment data structure 412 including this list of items to be shipped is shown with reference to FIG. 9A below as item shipment data structure 900. Inventory data structure 414 includes an inventory status and safety stock requirements for each origin 320 and destination 340. Inventory data structure also includes projected supply amounts 310 for each item for each origin and expected demand amounts 350 for each item for each destination. This information may be provided by an enterprise software solution, by specialized software for managing inventory across a distribution network, or even by a human expert with experience for a given network flow. An example of an inventory data structure 414 is shown with reference to FIG. 9B below as inventory data structure 910.

In a second step 510, managing module 450 may redact any committed items from the list of items for shipment, including associated quantities, for generating a redacted list of items for shipment. That is, any items already committed for shipment on a particular transportation unit, lane and day may be redacted from the list of items for the following processes. Because these items are already committed, they may not need to be prioritized or scheduled for shipment.

In a third step 515, prioritization module 460 prioritizes the redacted list of items based on various criteria, such as priorities 448, for generating a prioritized list of items for shipment. This can include the projected day of departure for a given item, current inventory of that item at the origin and destination, expected supply and demand of that item, and the relative inventory status of that item given safety stock requirements. Also, certain items may be given a higher or lower priority based on certain customer requirements. An example of this prioritization process is described in greater detail below with reference to FIG. 6A. An example of the generated prioritized list of items for shipment is shown below with reference to FIG. 9B as a prioritization data structure 920.

Then in step 520, loading module 480 is utilized to simulate loading of any committed transportation units that do not have committed items dedicated to those transportation units. That is, any committed transportation units that are available for loading may have that loading simulated by loading module 480 with the highest priority items for the day and lane for that committed transportation unit. This information may be provided to a user as part of optimized item shipment data structure 422. An example of this loading process is described in greater detail below with reference to FIG. 6C.

Figure 9E:
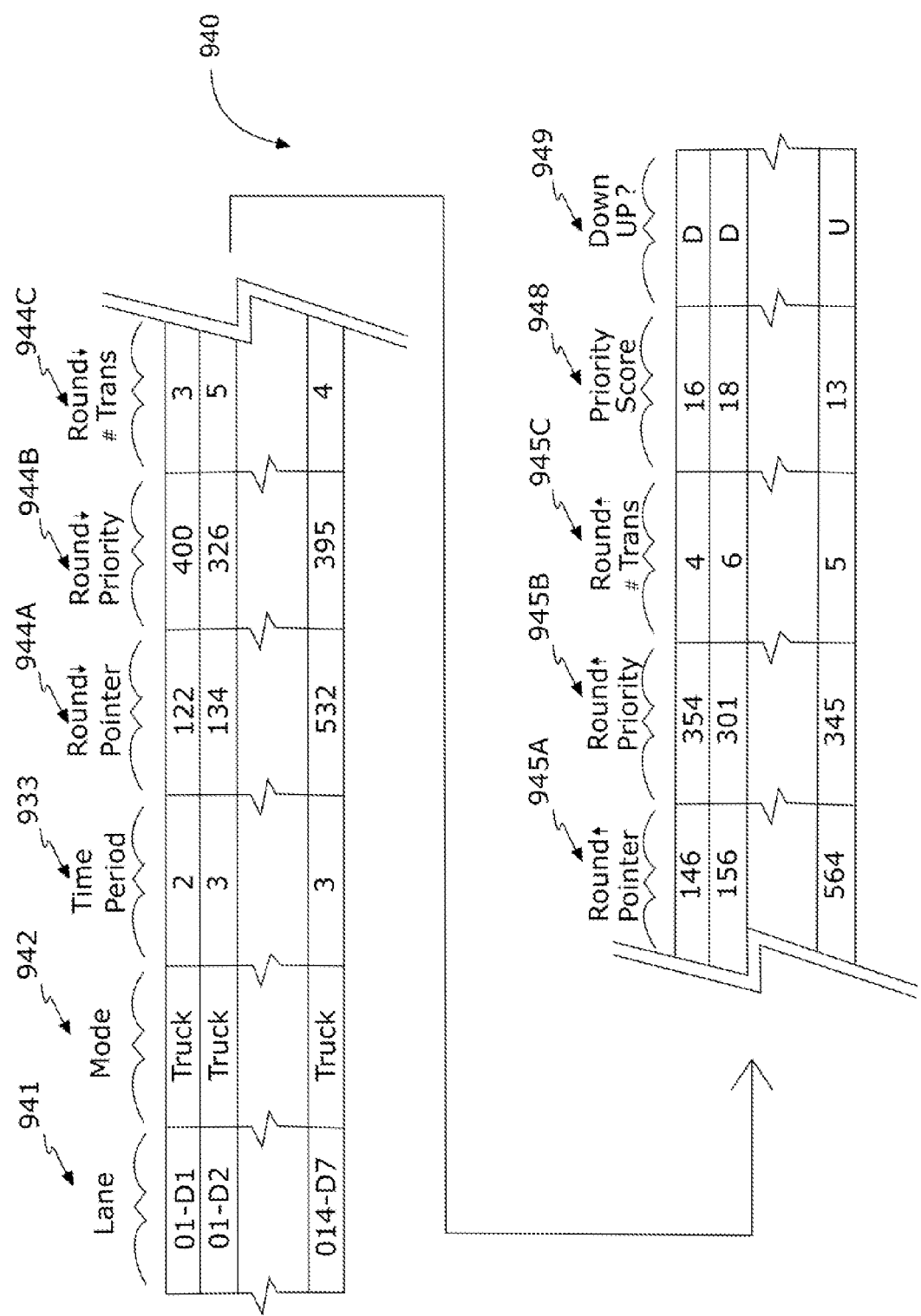
Figure 9F:
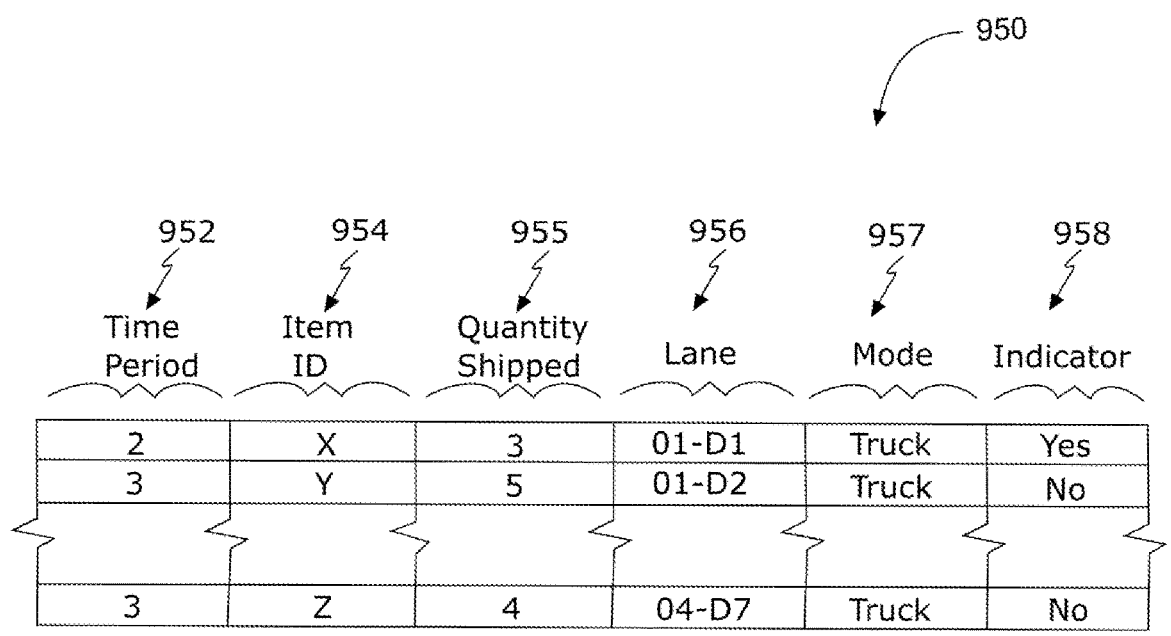

Next, in step 525, managing module 450 redacts, or otherwise indicates through use of loaded indicator 929, the items simulated for loading committed transportation units in step 520, thereby provide a reduced priority list of items for optimization, loading and smoothing as described below. In addition, the committed transportation units are indicated as not available for the optimization, loading and smoothing process as described below. That is, because these transportation units are already committed, the transportation units and the items to be loaded onto them are not available for adjustments during the subsequent optimization and smoothing processes described below. The indications may also be found in as indicator 958 of optimized item shipment data structure 950 as shown in FIG. 9F and in other data structures one of ordinary skill in the art would utilize in such implementations of the present embodiment or other embodiments of the present invention.

In step 530, optimization module 470 optimizes a set of shipments across lanes 330 for each time period based on the inventory of and supply to origins 320, the inventory of and demand from destinations 340, loading and unloading capacities of origins and destinations, item prioritization from step 420, and costs associated with shipping across lanes 330. This optimization may be performed for each day, lane and mode which does not already have a smoothing result such as described below. However, any day lane mode which does have a smoothing result will be taken into consideration with regards to the day lane mode that does not have a smoothing result. The information needed for this optimization may be found in inputs 410 and memory 442 as well as smoothing results shown in smoothing data structure 940. This optimization may be performed utilizing a network linear programming model or other optimization techniques. The set of shipments includes an optimized number of transportation units for each day, lane and mode. However, as described further below, the optimized number of transportation units for each day, lane and mode may be non-integer. The results of the optimization may be reflected in an optimization data structure, which is an intermediate working data structure not shown in FIG. 4. Alternatively, an initial solution may be generated utilizing some general models and human experience, which can then be optimized as described below including the use of a network linear programming model or other optimization techniques when this step is repeated. An example of the optimization data structure is described below with reference to FIG. 9D as optimization data structure 930. An example of this optimization process is described in greater detail below with reference to FIG. 6B.

In step 535, managing module 450 identifies two or more shipping options for each optimized day, lane and mode combination entry. In the present embodiment, this identification is performed for each day lane mode entry which needs a decision on the number of transportation units to commit. That is, the day lane mode entries which do not need a decision on the number of transportation units to commit may be solved in a future time period and running of the optimization system when those entries need such a decision. Alternative embodiments may perform this process on additional day lane mode entries. In the present embodiment, the first shipping option is a rounded down integer value (e.g., truncated to an integer value) of the optimized number of transportation units for a given day, lane and mode. The second shipping option is the rounded down integer value plus one. This is because the results of step 530 are non-integer and transportation units generally work in integer amounts. The rounded down integer value and rounded down integer value plus one are referred to herein as unit integer values and may also be referred to herein as round down and round up. The results of the round down and round up may be reflected in optimization data structure 930 as round down number of transportation units 937A and round up number of transportation units 937B. Alternative embodiments may round up and then subtract one to achieve the same results. In addition, alternative embodiments may utilize other integer amounts besides those mentioned in this step. In addition, alternative embodiments may work with other amounts such as half vehicle loads where load sharing may be available. Step 540 below is then performed, in the present embodiment, for each day lane mode combination, including for the rounded down integer value of the optimized number of transportation units and the rounded up integer value of the optimized number of transportation units. After all day lane mode unit integer value entries (which need a decision on the number of transportation units to commit) are simulated for loading by step 540, then processing continues to step 550. In alternative embodiments, step 540 may be performed for additional day lane modes for planning or other purposes.

Subsequently in step 540, loading module 480 determines how this optimized set of transportation units may be loaded with items for each day, lane, mode and unit integer amounts. In this embodiment, the loading module does not need to know which day or lane that the set of transportation units are being loaded, the loading module just simulates the loading of a set of transportation units with a set of items as may be requested. Alternative embodiments may concurrently simulate the loading of multiple types of transportation units, across multiple lanes, or even across multiple days. In summary, the transportation units identified, such as in step 430 above, are simulated to be loaded with items generally in accordance with the prioritization of those items, attributes of those items, and requirements specified for the transportation units being loaded. A data structure of item attributes (e.g., pallet size, weight, crushability, etc.) may be accessed for use in this simulated loading. Transportation units typically have certain weight, volume and balancing requirements which affect this simulated packing. This simulated loading of transportation units can be determined through the use of artificial intelligence, with techniques such as reinforcement learning or other similar methods. Once the simulated loading is complete, then the results may be indicated in smoothing data set 940 as shown in FIG. 9E through the use of pointers to the index of prioritization data set 920. Step 540 is described in greater detail below with reference to FIG. 6C. As described in step 535 of the present embodiment, step 540 is performed for each day lane mode entry, including both round down and round up integer values, which need a decision on the number of transportation units to commit. In alternative embodiments, step 540 may be performed for additional day lane modes for planning or other purposes.

In steps 550-565, managing module 450 and smoothing module 490 generate a smoothing of shipments across days, lanes and modes to improve overall efficiency of the network flow to reduce overall costs while maintaining on-time deliveries. This includes loading, transportation and unloading costs. In the present embodiment, this smoothing is performed for each day lane mode entry which needs a decision on the number of transportation units to commit. That is, the day lane mode entries which do not need a decision on the number of transportation units to commit may be solved in a future time period and running of the optimization system when those entries need such a decision. Alternative embodiments may perform this process on additional day lane mode entries. This smoothing process is described in greater detail below with reference to FIG. 6D. As will be shown with reference to FIG. 6D, smoothing of shipments of items typically results in increased system efficiency for reasons shown therewith.

In step 550, managing module 450 generates a priority score for each day lane mode entry which needs a decision on rounding down or rounding up. This priority score is to help in identifying the day lane mode entry in which a decision on rounding up or rounding down (i.e., smoothing) would have the greatest impact. In the present embodiment, this priority scoring is performed by managing module 450, but it may be performed by loading module 480 or smoothing module 490. Alternative embodiments may other processes for ranking day lane mode unit integer value combinations. The results of this priority scoring may be stored in smoothing data structure 940 as shown in FIG. 9E.

Then in step 555, smoothing module 490 identifies the day lane mode entry with the highest priority score for making a determination whether to round down or round up. That is, this smoothing determination is to be performed on the day lane mode entry in which a smoothing determination on rounding up or rounding down (i.e., smoothing) would may have the greatest impact to improve overall efficiency of the network flow and reduce overall costs as indicated by the priority score. As described above, the priority score used to identify the day lane mode entry is based on the priority of items either loaded or not loaded into the transportation units for a given day lane mode, which is based on the factors utilized by prioritization module as described above (e.g., suggested day of shipping, destination inventory risk, and origin inventory risk). In the present embodiment, only those day lane mode entries which need a decision on the number of transportation units to commit and which need a decision on rounding down or rounding up have a priority score.

Then in step 560, a smoothing determination is made whether to round down or round up the number of transportation units for the day lane mode entry with the highest priority score. This smoothing determination of the better shipping option is made based on two criteria as follows. First, would rounding up to a greater number of transportation units (e.g., unit integer value) for the day lane mode entry exceed the constraints utilized by optimization module 470? If yes, then the round down shipping option should be indicated. Second, would rounding up to a greater number of transportation units (e.g., unit integer value) exceeds certain predefined thresholds, which may be user defined? If yes, then the round down shipping option should be indicated. If no to both the first or second criteria, then rounding up should be indicated. This determination provides for the smoothing of shipments while meeting the constraints utilized by optimization module 470 to improve overall efficiency of the network flow, thereby reducing overall costs while maintaining on-time deliveries. This includes loading, transportation and unloading costs. That is, the results of the smoothed set of shipments and the loading module are analyzed to determine whether there are sufficient transportation fluctuations where smoothing of shipments for one or more lanes could reduce overall costs This smoothing determination is described in greater detail below with reference to FIG. 6D.

In step 565, it is determined whether additional day lane mode entries need smoothing determinations on the number of transportation units. If there are no other day lane mode entries needing a round down round up determination of transportation units, then no further smoothing determinations are needed and processing can continue to step 570. In addition, if there is no more capacity for rounding up any of the day lane mode entries needing a round down round up determination within the constraints utilized by optimization module 470, then all remaining day lane mode entries needing a smoothing determination can be indicated to round down and processing can continue to step 570. Otherwise, processing can return to step 530 above for additional optimization, loading and smoothing of the remaining day lane mode entries needing smoothing determinations. As a result, the sequence of optimizing, loading and smoothing may be repeated up to one less than the number of day lane mode entries in the present embodiment. In alternative embodiments, processing may return to step 555. However, such alternative embodiments may result in exceeding certain network constraints due to the impact of each smoothing determination on the network and network constraints as a whole.

In step 570, the results of the prioritization, shipment planning, loading simulation, and smoothing are provided to a user. In the present embodiment, the primary results provided are: 1) a set of shipments for the time period where shipments need to be committed (typically 2-4 days in the future), including simulated loading results for that set of shipments; and 2) the set of simulated loading for the time period where items need to be committed for shipping (typically 1-2 days in the future). Optimized item shipment results may be shown as optimized item shipment data structure 950 with reference to FIG. 9F. Optimized transportation unit results may be shown as optimized transportation unit shipment data structure 960 with reference to FIG. 9G. Expected inventory results from this shipping may also be provided to the user, such as shown with reference to FIG. 9H as expected inventory data structure 970. Additional results can be provided as needed or as requested by a user.

Figure 6A:
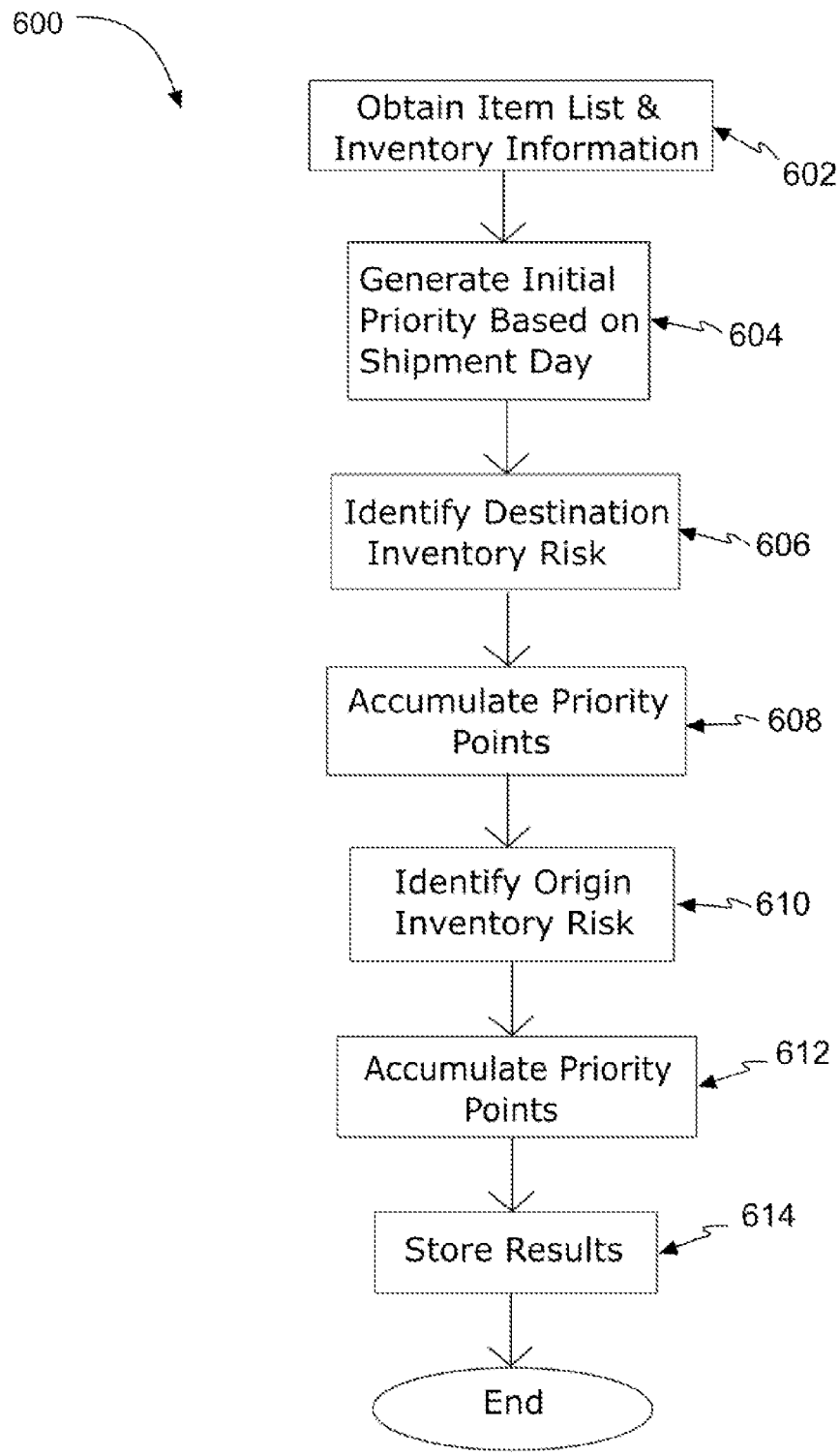
FIGS. 6A-6D provide flow diagrams of elements of the optimization system managing an optimization of the network flow in which various embodiments of the present disclosure may be implemented.
Figure 6B:
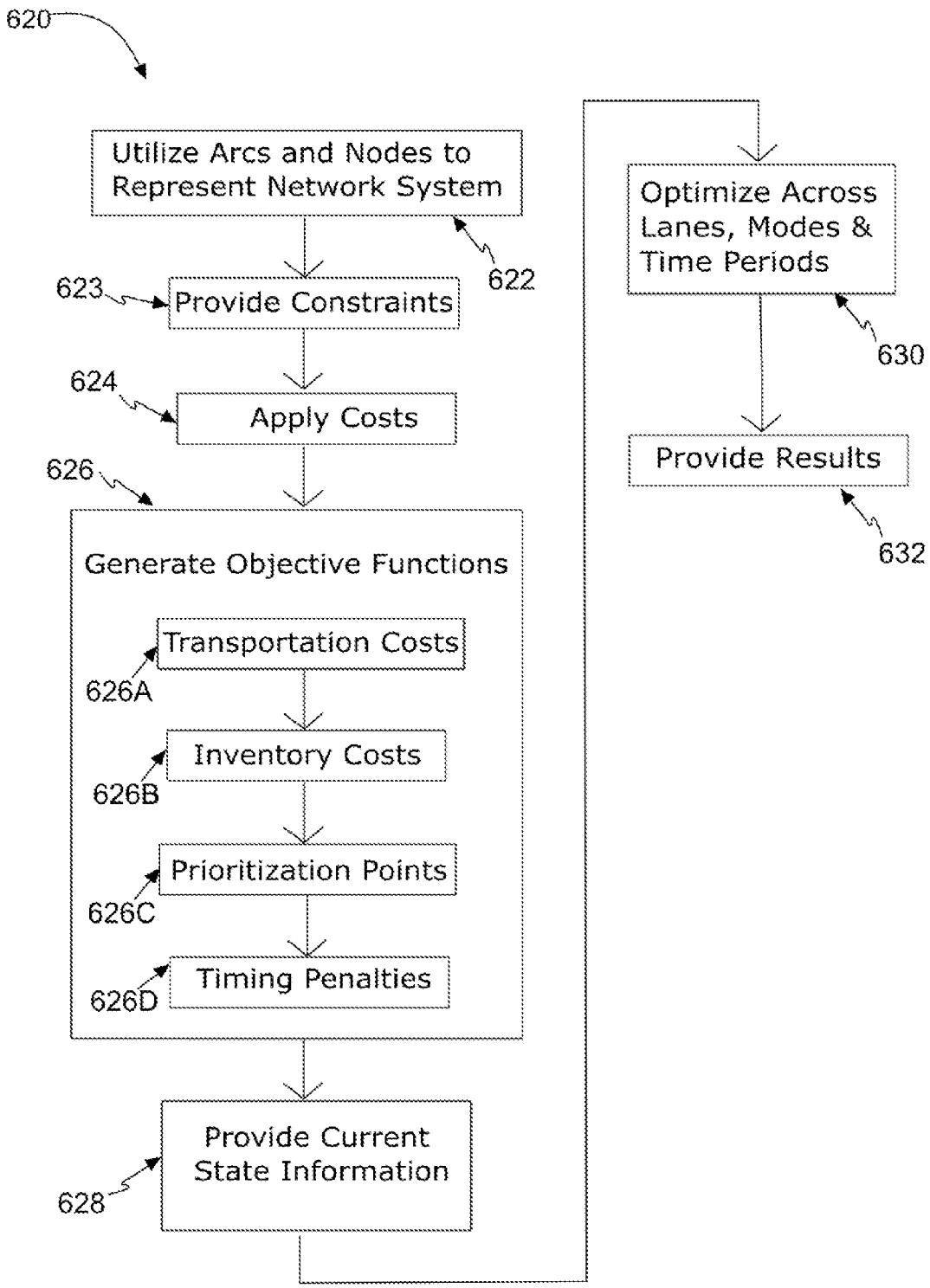
Figure 6C:
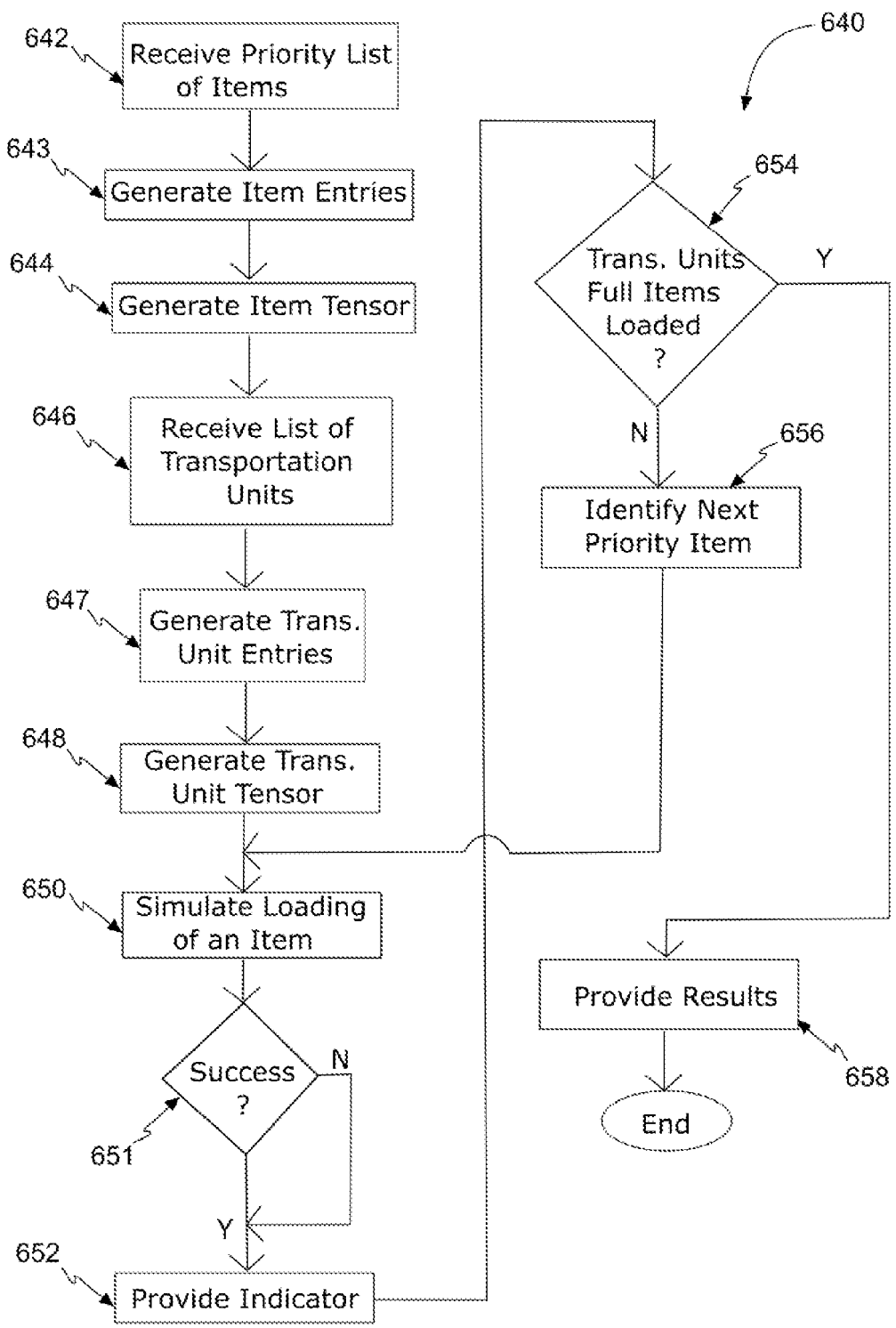
Figure 6D:
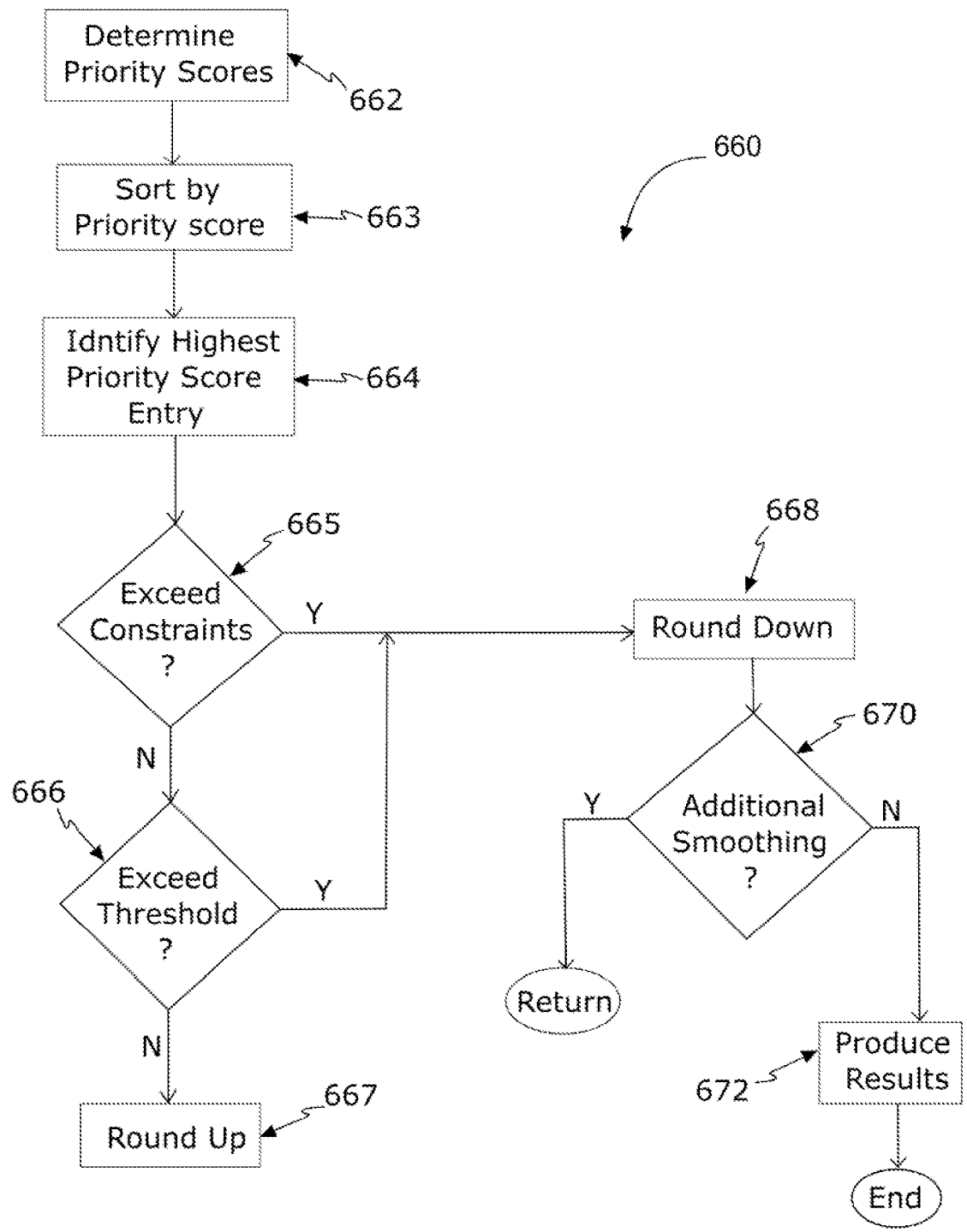

FIGS. 6A-6D provide flow diagrams of the optimization system managing optimization of the network flow in which various embodiments of the present disclosure may be implemented. The description of these figures may reference elements from other figures herein for illustrative purposes. FIG. 6A is directed to the operation of prioritization module 460. FIG. 6C is directed to the operation of loading module 480. FIG. 6B is directed to the operation of optimization module 470. FIG. 6D is directed to the operation of the smoothing module. The operation of the managing module is generally discussed in FIG. 5 above.

FIG. 6A provides a flow diagram 600 of prioritization module 460 prioritizing a list of items (which may be redacted as described in step 510 above) based on various criteria which can be customized for a given network flow in which various embodiments of the present disclosure may be implemented. FIG. 6A is described with some references to the data structures illustrated in FIGS. 9A and 9B. This prioritization can include the projected day of departure for a given item, current inventory of that item at the origin and destination, expected supply and demand of that item, and the relative inventory status of that item given safety stock requirements. Also, certain items may be given a higher or lower priority based on customer requirements. In this embodiment, prioritization of each item is indicated with a point system such as from 1 to 500 with a higher priority item having a higher number of points. Alternative embodiments may utilize alternative values to indicate priority or utilize a hierarchical structure or other format to indicate the relative priority of a given item for a given time period and lane compared to other items. A useful aspect of a point based priority system is that it can be utilized in a reward penalty system to encourage desirable results, and it can be easily modified as needed.

In a first step 602, a list of items to be shipped is derived from item shipment data structure 900 to generate prioritization data structure 920. An example of prioritization data structure 920 is illustrated in FIG. 9C. This list includes an index 921, item identifier 922, time period 923, lane 924, mode 925 (i.e., the type of transportation unit), the quantity of items 926 to be shipped (e.g., pallets) on that time period, lane and mode, a priority score 928 to be generated by prioritization module 460, and a loaded indicator 929 to indicate whether an item has been loaded into a transportation unit pursuant to the optimization, loading and smoothing process described herein. Item prioritization data structure may be initially sorted or otherwise reorganized by item identifier, lane, mode and day. The item identifier may be a unique identifier such as a SKU (stocking unit) for each item to be shipped across lanes 330 by a transportation unit for multiple time periods 305. For ease of explanation, each time period will be described below as a day, although other time periods may be utilized. In addition, item quantities 315 and 355 shall be described below in pallets, although other forms of quantities can be utilized including volume, weight, etc. Also, in first step 602, an inventory status and safety stock requirements for each origin 320 and destination 340 as well as projected supply amounts 310 are obtained for each item for each origin and expected demand amounts 350 for each item for each destination may be accessed from inventory data structure 910. All of this information may be provided by an enterprise software solution, by specialized software for managing inventory across a distribution network, or even by a human expert with experience for a given network flow.

In step 604, an initial priority is generated for each item for each day and lane and mode. This priority is generated based on the expected day of shipment across the lane. For example, an item to be shipped on an earlier day (e.g., day 3) will be given a higher priority than an item to be shipped on a later day (e.g., day 5). An appropriate priority amount for each day could be assigned through the use of a lookup table with an appropriate priority value for each shipment day. Such a lookup table allows for each modification of the priority values for each shipment day, such as based on experience or simulation results. In the present example, an item shipped on a given day may receive a priority value of between 1 and 200, out of 500 possible priority value, with 200 being the higher priority. Alternative embodiments may utilize alternative point values or point value ranges.

In step 606, a destination inventory risk is identified for each listed item for each lane. This destination inventory risk is computed based on the need for a listed item at a destination based on that item's current inventory, expected demand, and safety stock requirements at that destination. For example, if three pallets of item X are to be shipped to destination Y, what is the effect of that shipment not being completed? If destination Y already has a shortage of item X and the expected demand is high, then the risk is high. If destination Y already has a surplus of item X and the expected demand is low, then the risk is low. This risk can be quantified based on a statistical range or other measures. This risk can then be normalized or otherwise treated to generate a risk quantity suitable for use in step 608. In the present embodiment, the exact day of shipment of item X is not considered in this risk analysis and the total quantity of items to be shipped on a given lane mode is utilized in computing the priority. However, in alternative embodiments, the exact shipment day or days and the precise number of items to be shipped for that shipment day could be considered as part of the destination inventory risk.

In step 608, the destination inventory risk is utilized to accumulate additional priority points to the initial priority for each listed item for each shipment and lane. The normalized risk quantity can be utilized to assign, through the use of a lookup table, an appropriate priority value. In the present example, an item for shipment on a given lane may receive a priority value of between 1 and 200, out of 500 possible priority value, with 200 being the higher priority. That is, an item with a high destination inventory risk may receive a higher priority value. As described above, alternative embodiments may utilize alternative point values or point value ranges.

In step 610, an origin inventory risk is identified for each listed item for each lane. This origin inventory risk is computed based on the need for a listed item at an origin based on that item's current inventory, expected demand, and safety stock requirements at that origin. For example, if four pallets of item X are to be shipped from origin Z, what is the possibility that the shipment may not be completed due to inventory shortages? If origin Z already has a shortage of item X, then the risk is high. If origin Z already has a surplus of item X, then the risk is low. This risk can be quantified based on a statistical range or other measure. This risk can then be normalized or otherwise treated to generate a risk quantity suitable for use in step 612. In the present embodiment, the exact day of shipment of item X is not considered in this risk analysis and the quantity of items to be received at an origin on a given day is not utilized in computing the priority. However, in alternative embodiments, the exact shipment day or days and the precise day for receiving items at an origin could be considered as part of the origin inventory risk.

In step 612, the origin inventory risk is utilized to add additional priority points to the accumulated priority for each listed item for each shipment day and lane. The normalized risk quantity can be utilized to assign, through the use of a lookup table, an appropriate priority value. In the present example, an item for shipment on a given day and lane may receive a priority value of between 1 and 100, out of 500 possible priority value, with 100 being the higher priority. That is, an item with a high origin inventory risk may receive a higher priority value. As described above, alternative embodiments may utilize alternative point values or point value ranges.

In step 614, prioritization data structure 920 is sorted by lane mode priority and then stored in memory for easy access by the processes described below. Processing then ceases for FIG. 6A. In the present embodiment, these priorities are not recalculated or adjusted until another time period is started, in which case the priorities are all recalculated taking into account updated information since the last time period. In alternative embodiments, additional factors and considerations may be utilized in generating priority points for each item for each shipment day and lane.

FIG. 6B provides a flow diagram 620 of an optimization module optimizing the network flow of transportation units and items through a supply chain network system, in which various embodiments of the present disclosure may be implemented. The below is described in terms of utilizing a network linear programming model, although one of ordinary skill in the art may utilize other optimization techniques.

In a first step 622, a model is started for representing the supply chain network system for utilization by the optimization module. A common approach for modeling a network system and flows through that network system, known to those of ordinary skill in the art, is the use of nodes and arcs. Such a node and arc model may look similar to the network system illustrated in FIG. 3. Nodes may represent origin and destination locations as well as supply and demand nodes to the origin and destination nodes. Additional nodes may be utilized as well such as for representing the actual unloading and loading of transportation units at a location node. Arcs, also referred to as edges, can represent transportation units shipping items between origin and destination locations (e.g., location nodes) as well as between nodes for the loading and unloading of transportation units with their respective location nodes. Arcs may also represent receiving external input from a supply node and providing external output from a location. Arcs nodes may be utilized as well such as for representing the actual unloading and loading of transportation units at a location node.

In step 623, specific constraints are provided for the modeled supply chain network system. These constraints can include specific the capacities of the location nodes to accept, store and provide items as needed, including required safety stores of those items. For example, a location node (e.g., a warehouse) may be able to accept a certain number of transportation units for unloading items contained in those transportation units. That same location node may be able to store in inventory those unloaded items and other items up to a certain capacity. Furthermore, that same location node may be able provide items for a certain number of transportation units for loading and shipping of those items. Arcs, also referred to as edges, can represent transportation units shipping items between location nodes and supply or demand nodes, thereby representing supply and demand of items in transportation units to and from those location nodes in transportation units.

In a third step 624, certain costs may be applied to the modeled supply chain network system. These costs may represent the costs of receiving, unloading, storing in inventory, loading, and shipping items and transportation units. Additional costs can include certain prioritization points and timing penalties. These costs may be linear or non-linear based on activity through the various nodes and arcs. These costs may also increase or decrease on a per unit basis for this activity. Costs may also be monetary or non-monetary. For example, there may be a risk of inventory for a particular item at a particular location falling below certain safety stock levels. This risk may be non-monetary, but may be useful in applying certain rewards and penalties as described below.

Then in step 626, objectives functions are generated which describe the desired outcomes of the optimization. That is, the objective functions are minimized or maximized within the constraints of the network system to provide the desired results. In the present embodiment, it is desirable to minimize transportation costs while also minimizing risks associated with inventory dropping below safety stock levels, all within the constraints provided in step 623. Step 626 is shown in several sub-steps 626A-626B to describe objective functions utilized by the present embodiment. These objective functions may be combined into a single objective function or they may be solved sequentially or separately with the results balanced with each other. Alternative embodiments may utilize additional or alternative object functions.

In the present embodiment, there may be transportation costs for utilizing transportation units between locations, and those costs may increase on a per transportation unit basis. In addition, there are costs associated with loading and unloading transportation units, particularly if worker overtime is needed when a large number of transportation units need to be loaded or unloaded on a particular day. These transportation costs may be minimized as an objective function in step 626A.

In the present embodiment, there may be inventory costs associated with maintaining inventory as well as costs for that inventory falling below certain safety stock levels. These inventory costs may generally be viewed as non-monetary risks, but associated rewards and penalties may be utilized for balancing with the transportation costs. These transportation costs may be minimized as an objective function in step 626B.

In the present embodiment, there may be prioritization points for items, such as generated by prioritization module 460, which may also be utilized by an objective function for optimizing the network system. These prioritization points may generally be viewed as non-monetary risks, but associated rewards and penalties may be utilized for balancing with the other objective functions. These prioritization points of items not shipped may be minimized as an objective function in step 626C.

In the present embodiment, certain timing penalties may be applied for shipping items earlier than recommended as shown in item shipment data structure 900. In addition, certain penalties may be applied for shipping items later than recommended as shown in item shipment data structure 900. These penalties may be greater for shipping later than for shipping earlier. These penalties may also be greater for shipping more than 1 time period either earlier or later than recommended. These timing penalties may generally be viewed as non-monetary risks, but associated rewards and penalties may be utilized for balancing with the other objective functions. These timing penalties may be minimized as an objective function in step 626D.

The nodes and arcs and the associated constraints of steps 622 and 623 may be generally stable and not change on a daily basis. The costs and objective function of steps 624 and 626 may generally be more variable, but may not change on a daily basis. Much of this information may be stored in memory 442. What may change on a daily basis is the current state of the supply chain network system. That is, the current inventory of the various nodes as well as the external supply and the external demand may vary daily for the network system. It is this current state information which is provided in step 628 to the modeled system through inputs such as item shipment data structure 900 and inventory data structure 910 as illustrated in FIGS. 9A and 9B as well as the prioritization data structure 920 illustrated in FIG. 9C. Steps 622 through 628 may generally be referred to as modeling the supply chain network system. This modeling may be updated on a periodic basis such as daily, then utilized to optimize the supply chain network system for that time period.

In step 630, optimization module then optimizes a set of shipments across lanes and modes each time period based on the inventory of and supply to origins, the inventory of and demand from destinations, loading and unloading capacities of origins and destinations, item prioritization, and costs associated with shipping across lanes. This optimization may be performed for each day, lane and mode which does not already have a smoothing result such as described herein. However, any day lane mode which does have a smoothing result will be taken into consideration with regards to the day lane mode that does not have a smoothing result. The information needed for this optimization may be found in inputs 410 and memory 442 as well as smoothing results shown in smoothing data structure 940. This optimization may be performed utilizing a network linear programming model or other optimization techniques. The set of shipments includes an optimized number of transportation units for each day, lane and mode. However, the optimized number of transportation units for each day, lane and mode may typically be non-integer.

In step 632, the results of the optimization may be provided in optimization data structure 930 and smoothing data structure 940, which may be intermediate working data structures. Alternatively, an initial solution may be generated utilizing some general models and human experience, which can then be optimized as described herein including the use of a network linear programming model or other optimization techniques when this step is repeated. Processing then ceases for the optimization module and returns to either the management module or loading module for further processing.

FIG. 6C provides a flow diagram 640 of a loading module simulating the loading of transportation units with items, in which various embodiments of the present disclosure may be implemented. FIG. 6C is described with some references to the loading module illustrated in FIG. 8 and the prioritization data structure illustrated in FIG. 9C. In this embodiment, loading module 850 may not know which day or lane that the set of transportation units are being loaded, the loading module may just simulates the loading of a set of transportation units with a set of items as may be requested. Alternative embodiments may concurrently simulate the loading of multiple types of transportation units, across multiple lanes, or even across multiple days. In summary, the transportation units identified, such as in step 430 above, are simulated to be loaded with items generally in accordance with the prioritization of those items, attributes of those items, and requirements specified for the transportation units being loaded. A data structure of item attributes (e.g., pallet size, weight, crushability, etc.) may be accessed for use in this simulated loading. Transportation units typically have certain weight, volume and balancing requirements which affect this simulated packing. This simulated loading of transportation units can be determined through the use of artificial intelligence (AI), with techniques such as reinforcement learning or other similar methods. Alternative systems besides AI may be utilized to simulate or determine loading of transportation units, including other types of learning systems or other more static systems programmed for transportation unit loading.

In a first step 642, a priority list of items 810 (such as from prioritization data structure 920 as indicated by pointers to index 921) to be loaded onto the set of transportation units 815 is received for processing. Priority list 810 could include the identifiers of the items (e.g., SKU) and priority. Packing attributes of the items may also be concurrently received or may be obtained through the use of an item attribute data structure with that information. Then in step 643, a set of item entries 820 are generated with one entry for each item to be loaded, in the present embodiment. That is, if there are three pallets of item x to be loaded, then there would be three entries, one entry for each pallet of item x. Alternative embodiments could utilize other approaches for loading multiples of item x. In step 644, an item tensor 840 is then generated from the set of item entries by the AI or other similar tool. A tensor is essentially a matrix of information representing the entries of items to be loaded that is organized by the AI to allow for rapid simulation (or determination) of loading the items into the transportation units. This item tensor generation process is the result of training the AI with a dataset of items and transportation units including rewards and penalties for successful and unsuccessful results, respectfully. The AI utilized to implement the simulated loading may be a learning system which may be trained utilizing prior examples of loading, with the use of predetermined examples identified for teaching certain principles of loading, with generated random examples, or through other techniques known to those skilled in the art. This training can then be supplemented through additional learning by the AI (i.e., retraining the learning system) with actual loading data generated after the original set of loading data or with additional loading data generated through other techniques known to those skilled in the art. This additional or supplemental training may be performed continuously (as each load is simulated), or periodically in batches (such as daily) to avoid slowing the ongoing loading simulations. The AI may also be replaced with an alternative AI that achieves an improved average reward to penalty score. The reward to penalty scoring may also be modified to improve overall success of the AI in simulating loading, taking into a variety of different factors that may provide economic improvements to the resulting loading process. Such alternative AIs may be run in parallel with a current AI to compare results of each AI.

Then in step 646, the set of transportation units 815 to be loaded with the priority list of items 810 is received for processing. The loading attributes (i.e., loading requirements) of the transportation units may also be concurrently received or may be obtained through the use of a transportation unit data structure with that information. Then in step 647, a set of transportation unit entries 825 are generated with one entry for each transportation unit to be loaded, in the present embodiment. That is, if there are three container trucks to be loaded, then there would be three entries, one entry for each transportation unit. Alternative embodiments could utilize other approaches for loading multiples of the transportation unit. In step 648, a transportation unit tensor 845 is then generated from the set of transportation unit entries by the AI or other similar tool. A tensor is essentially a matrix of embedded information representing the entries of transportation units to be loaded that is organized by the AI to allow for rapid simulation of loading the items into the transportation units. This transportation unit tensor generation process is the result of training the AI with a dataset of items and transportation units including rewards and penalties for successful and unsuccessful results, respectfully. This training can then be supplemented with additional learning by the AI with actual data post training.

In step 650, loading module 850 then starts simulating loading of the transportation units with the items. That is, the first time this step is performed, the first item with the highest priority is simulated as loaded in an optimal open location of the transportation units that is not already occupied with another item. Then in step 651, it is determined whether the item simulated as loaded was successfully loaded or not. An indicator of that success or not is provided to the priority list of items in step 652. Then in step 654, it is determined whether all the transportation units are full or if all the items have been loaded. If yes, then processing continues to step 658, otherwise processing continues to step 656. In step 656, the next highest priority item, based on priority or some other key metric by the artificial intelligence, is identified for loading and processing returns to step 650. In step 658, the simulated loading of the transportation units is provided with the list of items loaded or pointers provided to indices 921 of prioritization data structure 920 for further processing as described herein. For example, the loading results may be indicated in smoothing data set 940 through the use of pointers to the index of prioritization data set 920. Alternatively, the loading results may be indicated in optimized item shipment data structure 950.

The present embodiment is directed to the simulated loading of items by priority onto the transportation units. Alternatively, the transportation units could be loaded from front to back with a preference for higher priority items. In addition, certain constraints such as simulating loading in the corners or requiring each item to be loaded touch a prior loaded item, for purposes of speeding up the process of simulating loading. Also, one of ordinary skill in the art could appreciate other approaches to simulating the loading of items onto the transportation units.

FIG. 6D provides a flow diagram 660 of a smoothing module 490 smoothing the optimization of transportation units, in which various embodiments of the present disclosure may be implemented. In the present embodiment, optimization module 470 generated non-integer results for each time period lane mode combination, as shown in recommended number of transportation units 936. Loading module 480 provided simulated loading results of round down (e.g., truncated to an integer value) and round up (e.g., round down plus 1) integer values for each time period lane mode combination that is due for a transportation unit commitment. An example of the results of this balancing and smoothing process, for a single transportation lane between an origin location and a destination location, is described below with reference to FIG. 7. Alternative embodiments may do additional time periods for each lane mode combination. Smoothing module 490 is utilized to help determine which of each round down and round up integer values (i.e., shipping option) is preferred for each time period lane mode combination. The preferred result is generally considered to be the result that improves overall efficiency of the network flow to reduce overall costs while maintaining on-time deliveries within constraints including loading, transportation and unloading costs. This includes loading, transportation and unloading costs. In the present embodiment, this smoothing is performed for each day lane mode entry which needs a decision on the number of transportation units to commit. That is, the day lane mode entries which do not need a decision on the number of transportation units to commit may be solved in a future time period and running of the optimization system when those entries need such a decision. Alternative embodiments may perform this process on additional day lane mode entries.

In a first step 662, prior to invoking prioritization module 460, managing module 450 determines a priority score 948 for each entry of smoothing data structure 940 which needs a decision on rounding down or rounding up. As described herein, smoothing data structure 940 may have been initially generated by prioritization module 460 or managing module 450 and may be updated by loading module 480 as well as smoothing module 490. In the present embodiment, priority score 948 is generated by a ratio driven weighting of round down priority 944A and round up priority 945A (e.g., a first weighting factor times round down priority 944A plus a second weighting factor times round up priority 945A). This provides a result that may emphasize rounding down or rounding up, but also provides a comparable value between lane mode time period entries in smoothing data structure 940 whereby the entry with the higher priority items not loaded (or loaded depending on how priority 944A and 944B are generated) has a higher priority score. Alternative embodiments may utilize other factors, formulas, etc. to generate a priority score such as increasing the priority score based on the number of transportation units recommended for that lane mode time period entry. In addition, a user may be able to manually or automatically increase the priority score for certain lane mode time period entries as desired. Then in step 663, smoothing data structure 940 may be sorted or otherwise reorganized based on the priority score. This allows for the lane mode time period entry with the highest priority score to be processed first, followed by the entry with the next higher priority score.

In step 664, the entry with the highest priority score that does not have a round down round up decision 949 is identified for determining whether to round down or round up. That is, this smoothing determination is to be performed on the day lane mode entry in which a smoothing determination on rounding up or rounding down (i.e., smoothing) would may have the greatest impact to improve overall efficiency of the network flow and reduce overall costs as indicated by the priority score. As described above, the priority score used to identify the day lane mode entry is based on the priority of items either loaded or not loaded into the transportation units for a given day lane mode, which is based on the factors utilized by prioritization module as described above (e.g., suggested day of shipping, destination inventory risk, and origin inventory risk). In the present embodiment, only those day lane mode entries which need a decision on the number of transportation units to commit and which need a decision on rounding down or rounding up have a priority score.

In step 665 and 666, a smoothing determination is made whether to round down or round up the number of transportation units for the day lane mode entry with the highest priority score. This smoothing determination of the better shipping option is made based on two criteria as described in steps 665 and 666. Alternative embodiments may utilize other or additional criteria to make this smoothing determination. In step 665, a constraint based determination is made whether the lane mode time period entry rounded up to a greater number of transportation units (e.g., unit integer value) would exceed the constraints utilized by optimization module 470. This constraint based determination is made based on the round down round up smoothing determination for all lane mode time period entries that have such a smoothing determination and an assumed round down smoothing determination for all lane mode time period entries that do not have such a determination. If yes in step 665, then processing continues to step 668, otherwise processing continues to step 666. In step 666, a threshold based determination is made whether rounding up to a greater number of transportation units (e.g., unit integer value) would exceed certain predefined thresholds, which may be user defined. In the present embodiment, this determination is made based on reviewing the optimization module generated recommendation of transportation units 936 and determining whether rounding up would exceed that number of transportation units by 10%. In alternative embodiments, this threshold may be a different value, based on different criteria, or on other factors such as how much transportation costs would increase by rounding up versus rounding down. For example, an alternative embodiment may utilize certain historical information to determine whether rounding up the number of transportation units would exceed certain confidence interval thresholds, which may be user defined. If yes in step 666, then processing continues to step 668, otherwise processing continues to step 666.

Step 667 occurs when a round up constraint based determination would not exceed the constraints utilized by optimization module 470 as described in step 665 above, and when a round up determination would not exceed certain thresholds as described in step 666 above. That is, a smoothing determination for rounding up the number of transportation units for this time period lane mode entry would provide for the smoothing of shipments to improve overall efficiency of the network flow, thereby reducing overall costs while maintaining on-time deliveries. Upon this smoothing determination to round up, smoothing data structure 940 is updated in round down round up decision 949 to indicate that this time period lane mode entry should round up to the round up number of transportation units 945C. Loaded indicator 929 of prioritization data structure 920 is also updated to indicate which items are to be loaded, thereby preventing those items from being reloaded onto a subsequent iteration of the optimization, loading and smoothing process. In addition, final number of transportation units 938 of optimization data structure 930 may be updated with the corresponding number of transportation units from round up number of transportation units 937B. Processing then continues to step 670.

Step 668 occurs when a round up constraint based determination would exceed the constraints utilized by optimization module 470 as described in step 665 above, or when a round up determination exceeds certain thresholds as described in step 666 above. Alternative embodiments may utilize other criteria including a user providing certain manual or automatic determinations. Upon this smoothing determination to round down, smoothing data structure 940 is updated in round down round up decision 949 to indicate that this time period lane mode entry should round down to the round down number of transportation units 944C. Loaded indicator 929 of prioritization data structure 920 is also updated to indicate which items are to be loaded, thereby preventing those items from being reloaded onto a subsequent iteration of the optimization, loading and smoothing process. In addition, final number of transportation units 938 of optimization data structure 930 may be updated with the corresponding number of transportation units from round down number of transportation units 937A. Processing then continues to step 670.

In step 670, it is determined whether additional day lane mode entries need smoothing determinations on the number of transportation units. If there are no other day lane mode entries needing a round down round up determination of transportation units, then no further smoothing determinations are needed and processing can continue to step 672. In addition, if there is no more capacity for rounding up any of the day lane mode entries needing a round down round up determination within the constraints utilized by optimization module 470, then all remaining day lane mode entries needing a smoothing determination can be indicated to round down and processing can continue to step 672. Otherwise, processing can return to managing module 450 to continue processing additional entries to step 530 of FIG. 5 described above. This would result in additional iterations of the optimization, loading and smoothing process for the remaining day lane mode entries needing smoothing determinations. As a result, the optimizing, loading and smoothing process described herein may be repeated up to one less than the number of day lane mode entries in the present embodiment. In alternative embodiments, processing may return to step 664 above. However, such alternative embodiments may result in exceeding certain network constraints due to the impact of each smoothing determination on the network and network constraints as a whole.

In step 672, the results of the prioritization, shipment planning, loading simulation, and smoothing are provided to a user. In the present embodiment, the primary results provided are: 1) a set of shipments for the time period where shipments need to be committed (typically 2-4 days in the future), including simulated loading results for that set of shipments; and 2) the set of simulated loading for the time period where items need to be committed for shipping (typically 1-2 days in the future). Optimized item shipment results may be shown as optimized item shipment data structure 950 with reference to FIG. 9F. Expected inventory results from this shipping may also be provided to the user, such as shown with reference to FIG. 9H as expected inventory data structure 960. Additional results can be provided as needed or as requested by a user. Processing then ceases for the smoothing module 490, although processing can return to managing module 450 for any additional final processing of the results of the optimization of the network.

Figure 7:
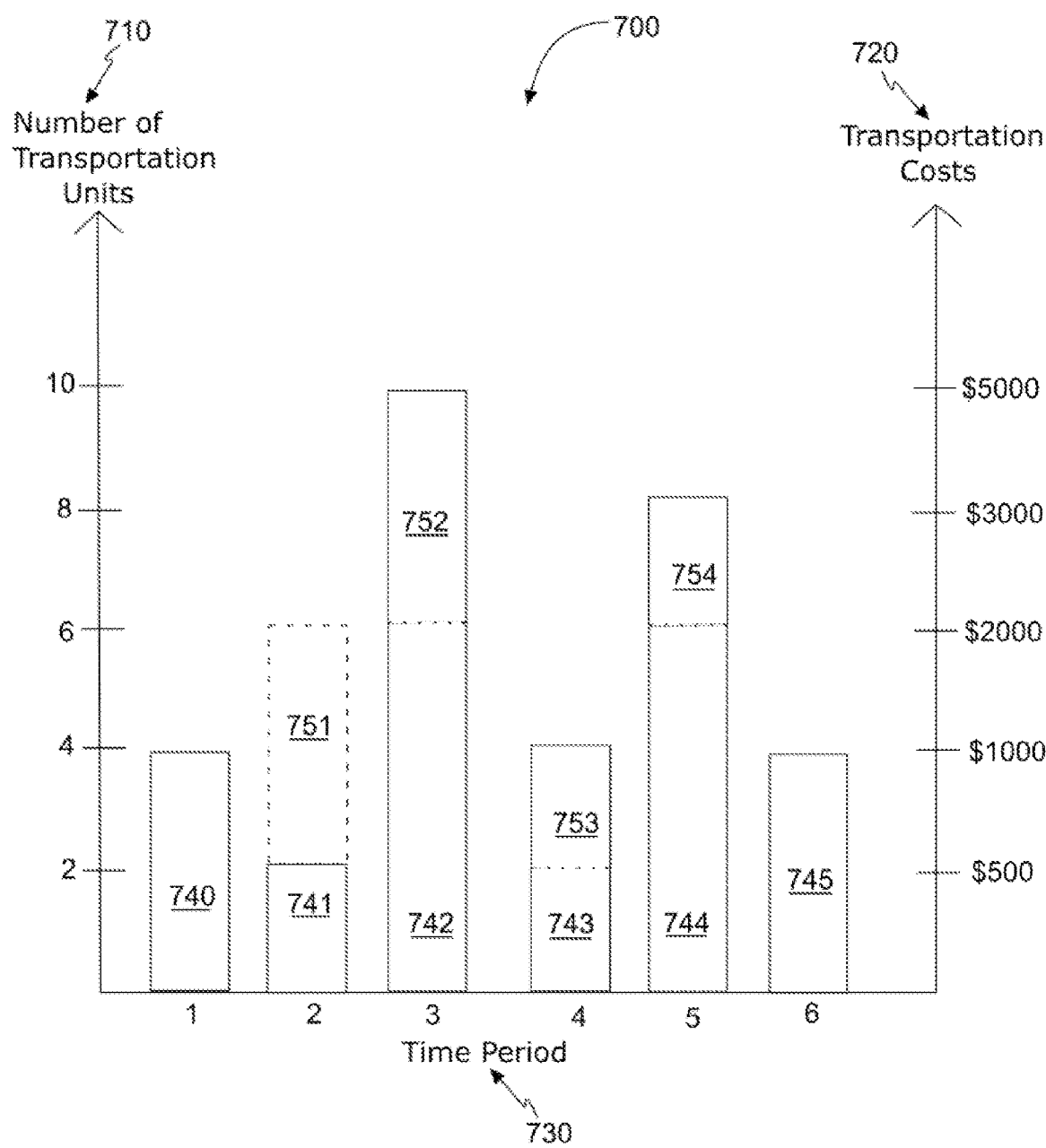
FIG. 7 provides a graphical representation of shipping items over multiple time periods for a given lane mode, in which various embodiments of the present disclosure may be implemented.

FIG. 7 provides a graphical representation 700 of shipping items over multiple time periods for a given lane mode, in which various embodiments of the present disclosure may be implemented. In graphical representation 700, there is a y axis for the number of transportation units 710 utilized for shipping items and a corresponding transportation costs 720 associated with utilizing these transportation units. There is also an x axis for the time period that items were shipped by the transportation units. The actual number of transportation units utilized for a given time period is shown in solid line bars 740, 741, 742, 743, 744 and 745. Also shown in dotted lines are modifications to the number of transportation units 751, 752, 753 and 754 that would reduce transportation costs while still shipping the associated items in a timely manner.

As shown in FIG. 7, for a given lane mode, there are 4 transportation units utilized on time period 1 for $1000, 2 transportation units on time period 2 for $500, 10 transportation units utilized on time period 3 for $5000, 2 transportation units utilized on time period 4 for $500, 8 transportation units utilized on day 5 for $3000, and 4 transportation units utilized on day 6 for $1000, resulting in a total of 30 transportation units utilized over 6 days for a total of $11,000. This is a common example of a supply chain network system that is demand driven. That is, the transportation of items is driven by demand over a period of time. Alternatively, with optimization and smoothing as described herein, some of the shipments may be moved forward in time to reduce transportation costs, so long as such adjustments is within the constraints of the supply chain network system model, and so long as other objective function factors do not affect this movement forward of shipments. As shown in FIG. 7, for a given lane mode, there are there are 4 transportation units utilized on time period 1 for $1000, 6 transportation units on time period 2 for $2000, 6 transportation units utilized on time period 3 for $2000, 4 transportation units utilized on time period 4 for $1000, 6 transportation units utilized on day 5 for $2000, and 4 transportation units utilized on day 6 for $1000, resulting in a total of 30 transportation units utilized over 6 days for a total of $9,000, a savings of $2000, all without shipping any items later than expected.

Figure 8:
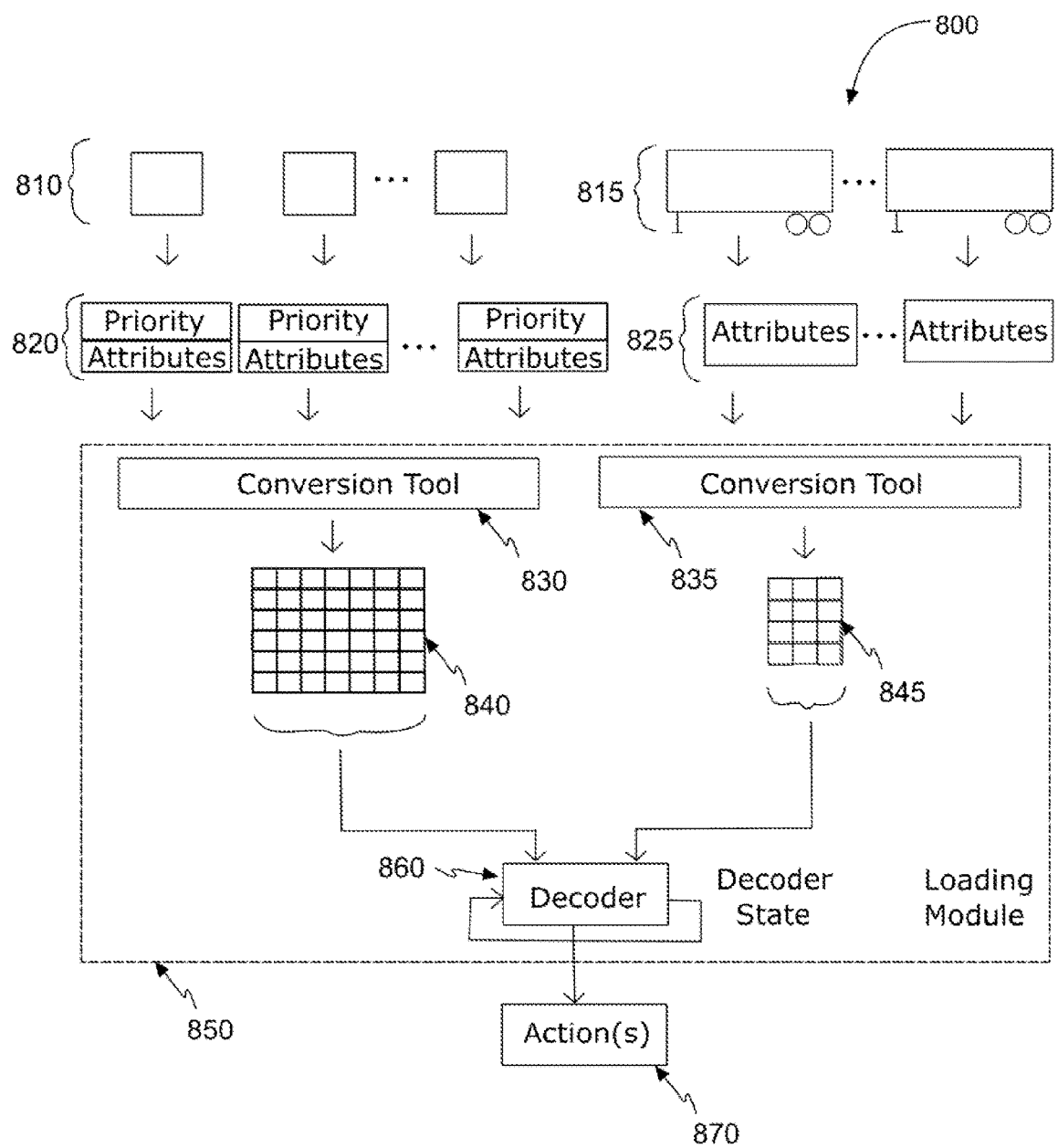
FIG. 8 provides a block diagram of a loading module for simulating the loading of transportation units with items, in which various embodiments of the present disclosure may be implemented.

FIG. 8 provides a block diagram 800 of a loading module 850 for simulating the loading of transportation units with items, in which various embodiments of the present disclosure may be implemented. Loading module 850 may be synonymous or similar to loading module 480. In this embodiment, the loading module does not need to know which day or lane that the set of transportation units are being loaded, the loading module just simulates the loading of transportation units with a set of items as may be requested. Alternative embodiments may concurrently simulate the loading of multiple types of transportation units, across multiple lanes, or even across multiple days. In summary, the transportation units identified, such as in step 530 above, are simulated to be loaded with items generally in accordance with the prioritization of those items, attributes of those items, and constraints specified for the transportation units being loaded. A data structure of item attributes (e.g., pallet size, weight, crushability, etc.) 449 may be accessed from memory 442 for use in this simulated loading. Transportation units typically have certain weight, volume and balancing requirements 449 which affect this simulated packing, which can also be accessed from memory 442. This simulated loading of transportation units can be determined through the use of artificial intelligence (AI), with techniques such as reinforcement learning or other similar methods.

Loading module 850 analyzes data from two sources, items 810 and transportation units 815. In this embodiment, products or other items for shipment are packed onto pallets referred to herein as items 810. Other types of packing of items can be utilized such as specialized shipping containers for loading into the hold of an aircraft, wooden or metal boxes which can be sealed with items for shipping, etc. In any case, a standardized form of holding products or other items may be utilized and may vary based on the type of transportation unit being utilized. As described herein, each such pallet or shipping container is referred to herein as an item. Transportation units 815 may be semitrailer trucks, flatbed trucks, refrigerated trucks, aircraft, railways cars, ships, etc. which can be loaded with items 810. In the present embodiment, loading module 850 is specific for a particular type of transportation unit and type of items. For example, a separate loading module may be utilized for a semitrailer truck and a flatbed truck, even if the pallets utilized for the items are the same for both types of trucks. Alternative embodiments may utilize one loading module for multiple types of transportation units with the type of transportation unit being an attribute utilized as an input for the transportation units.

As described above with reference to FIG. 6C, item entries 820 are generated which include the priority and attributes of each item to be loaded on the transportation units. If there are multiple items to be loaded, then multiple item entries may be generated, one for each item. The attributes of an item may include those attributes which may affect how that item is loaded onto the transportation units including size (length, width and height), weight, crushability, etc. The priority is the priority of that item being shipped such as described above with reference to FIG. 6A. Alternative embodiments may utilize one item entry for multiples of an item, such as by including the number of items as an attribute of that item. Transportation unit entries 825 are also generated (or obtained from storage) with one entry for each transportation unit to be loaded, in the present embodiment. Transportation unit entries 825 may include the attributes of each transportation unit to be loaded. This can include the interior dimensions of the semitrailer (length, width and height), total weight limit, axle weight limits, balancing requirements, etc. That is, if there are three container trucks to be loaded, then there would be three entries, one entry for each transportation unit. Alternative embodiments may utilize one transportation unit entry for multiple transportation units, such as by including the number of transportation units as an attribute of that transportation unit.

Loading module 850 then transforms or otherwise converts the item entries 820 and the transportation unit entries 825 into tensors 840 and 845, respectively. A tensor is essentially a matrix of embedded information representing the entries of transportation units to be loaded that is organized by the loading module to allow for rapid simulation of loading the items into the transportation units. This transportation unit tensor generation process is the result of training the loading module with a dataset of items and transportation units including rewards and penalties for successful and unsuccessful results, respectfully. This training can then be supplemented with additional learning by the loading module with actual data post training. Various types of networks or other tools may be utilized for performing this transformation or conversion of item entries 820 and transportation unit entries 825 into tensors 840 and 845. For example, a bidirectional static LSTM (long short-term memory) tool may be utilized, which allows certain information to persist during the loading process.

Once the tensors 840 and 845 have been generated, then a decoder 860 may be utilized for generating a set of actions 870 describing how items 810 are to be loaded onto transportation units 815 (or indicating that a particular item could not be loaded). As shown, the decoder may work repeatedly, one item at a time, to generate an action for each item.

Figure 9G:
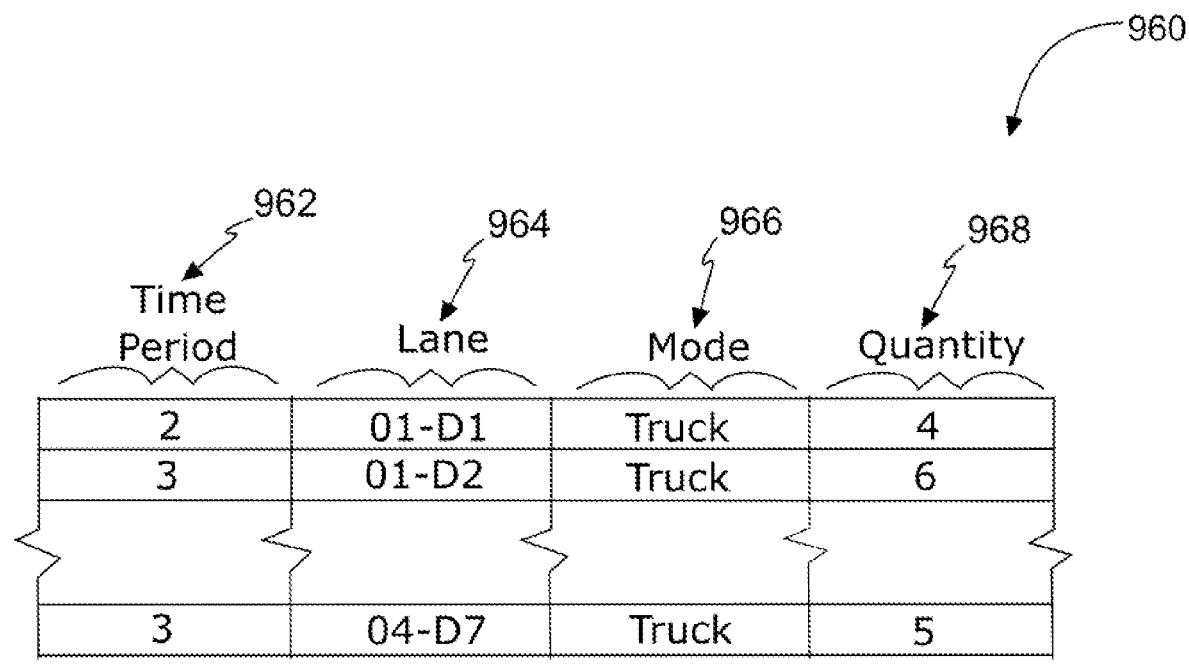
Figure 9H:
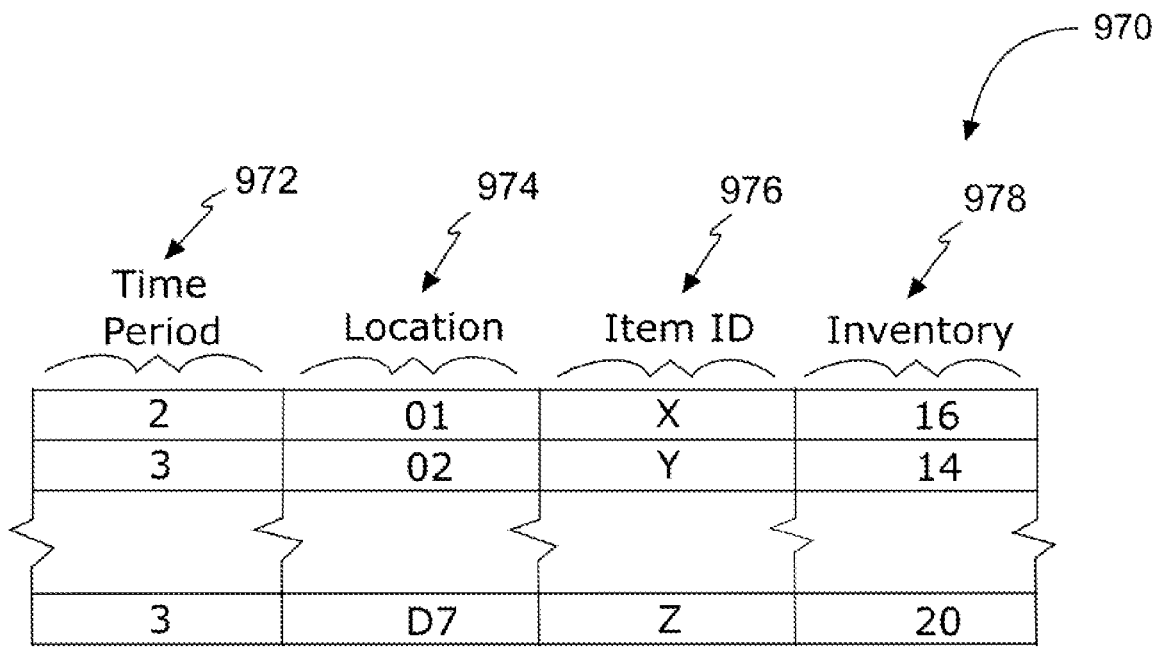

FIGS. 9A-9H provide block diagrams of data structures utilized by the optimization system for managing the optimization of the network flow in which various embodiments of the present disclosure may be implemented. Although these block diagrams are described as data structures, they may represent databases that may be queried or files of data provided from or to one or more sources by the optimization system. FIGS. 9A and 9B are directed to inputs 410 to optimization system 430 including item shipment data structure 900 and inventory data structure 910. FIG. 9C is directed to the results of prioritization module 460 which may not change other than being sorted or otherwise reorganized during a single periodic (e.g., daily) solve by optimization system 430. FIGS. 9D and 9E are generated by optimization module 470 for utilization and updating by loading module 480 and smoothing module 490 for optimizing shipments across all lanes and modes. FIGS. 9F, 9G and 9H are generated by optimization system 430 as outputs providing many of the results of the optimization system. Additional data structure may be utilized by one of ordinary skill in the art to implement the present embodiment or other embodiments of the present invention.

FIG. 9A provides a block diagram of item shipment data structure 900 including a list of items scheduled to be shipped by day across lanes and modes (type of transportation unit), in which various embodiments of the present disclosure may be implemented. This information may be provided by an enterprise software solution, by specialized software for managing inventory across a distribution network, or even by a human expert with experience for a given network flow.

In the present embodiment, item shipment data structure 900 includes multiple entries, once for each item shipped for each time period, lane and mode (if applicable). As shown, data structure 900 includes a time period 902, an item identifier of an item to be shipped 904, quantity of an item to be shipped 905, lane 906 and mode 908. In the present embodiment, data structure 900 is sorted by day, item, lane and mode, although alternative embodiments may utilize other organizations of the data. Time period 902 indicates the day or other time unit that the item is to be shipped. Item 904 may include a unique identifier of the item, such as a SKU. Quantity 905 includes the quantity of items to be shipped on that day for a given lane and mode, often in standard units such as pallets. Lane 906 may include the origin and destination of the shipment, and mode can include the type of transportation unit utilized to ship the item. Additional information such as how long the shipment occurs or when the item is expected to arrive at the destination may be included. Item shipment data structure 900 may also include an indicator which indicates whether an item is already committed for shipment on a committed transportation unit. That is, certain items may not be considered for prioritization, loading, optimizing or smoothing because those items are already committed and are not under consideration for any modifications. Data structure 900 is illustrated as a single linear file including all time periods, lanes and modes. Alternative embodiments may be organized as multiple files indexed by one or more of the elements of FIG. 9A, such as by day.

FIG. 9B provides a block diagram of inventory data structure 910 including an inventory and safety stock of items at each origin and destination including supplies to and demand from those inventories, in which various embodiments of the present disclosure may be implemented. Inventory data structure 910 includes an identifier of the location (origin or destination) 912, an identifier of an item 914 at that location, a current inventory 916 and a safety stock requirement 917 of that item at that location, and an expected supply or demand 918 for that item at that location, depending on whether the location is an origin or destination. Location identifier 912 includes a unique identifier for an origin or destination which also indicates whether that location is an origin or destination, such as by a leading indicator such as an O or S in the present example. Alternative embodiments may utilize a separate indicator. Item identifier 914 can include a unique identifier of the item, such as a SKU. Item attributes such as weight, height, width, crushability, etc. of each item identified may also be included in inventory data structure 910, or those item attributes may be accessible from another data structure indexed with item identifier 914. Current stock 916 includes the current inventory of that item at that location. Safety stock requirement 917 includes a required inventory level of that item at that location to avoid an inventory outage. Expected supply or demand 918 includes the expected supply of an item to that location in the case of an origin or the expected demand of an item from that location, typically in average number of pallets per time period. Alternatively, supply and/or demand could be shown on a daily basis (e.g., 3 pallets of item X arrive at origin O2 on day 3). The information in inventory data structure 910 may be provided by an enterprise software solution, by specialized software for managing inventory across a distribution network, or even by a human expert with experience for a given network flow. Alternative embodiments may utilize an historical data structure for generating much of this information based on prior experience through statistical analysis.

FIG. 9C provides a block diagram of prioritization data structure 920 in which various embodiments of the present disclosure may be implemented. Prioritization data structure 920 is initially derived from item shipment data structure 900. Prioritization data structure 920 includes a corresponding entry for each entry in item shipment data structure 900, although if an entry in item shipment data structure 900 is already committed for shipment on a committed transportation unit, it may not be included in prioritization data structure 920. Each entry in prioritization data structure 920 includes an index 921, item identifier 922, time period 923, lane 924, mode 925, quantity of items to be shipped 926 (e.g., pallets), priority 928 as determined by prioritization module 460 and as described herein with reference to FIG. 6A. Index 921 is utilized by pointers as described herein for pointing to items that may be loaded on a set of transportation units for a given lane mode. After each item is prioritized by prioritization module 460, prioritization data structure 920 may be sorted or otherwise reorganized by lane 924 mode 925 priority 928 for further use by optimization system 430, particularly optimization module 470. That is, optimization module 470 will optimize a number of transportation units for each lane mode based on priority of the items to be shipped on that lane mode. Index 921 is then generated in sequence once prioritization data structure 920 has been sorted. An indicator may also be included for each entry in prioritization data structure 920 to indicate whether that entry is to be to be shipped on a committed transportation unit. That is, loading module 480 may do an initial load of some non-committed high priority items on transportation units already committed, but those items do not need to be later considered by optimization module 470 and smoothing module 490. Alternative embodiments may utilize alternative prioritization methods, which can result in different fields in and organization of item prioritization data structure 920.

FIG. 9D provides a block diagram of an optimization data structure 930 generated by optimization module 470 and which may be supplemented by smoothing module 490, in which various embodiments of the present disclosure may be implemented. Transportation unit shipping data structure 930 includes a lane 932, mode 933, time period 934, recommended number of transportation units 936 for each lane mode time period, round down number of transportation units 937A, round up number of transportation units 937B, and a final number of transportation units 938 for each lane mode time period needing a transportation unit commitment. This data structure includes the recommended number of transportation units to be committed for each lane, mode and time period as generated by optimization module 470. The recommended number of transportation units is non-integer, which may create a need by smoothing module 490 to determine final number of transportation units 938 as an integer value which meets the constraints utilized by the optimization module. Portions of this data structure may be updated or regenerated each iteration of optimization module 470.

FIG. 9E provides a block diagram of a smoothing data structure 940 which may be generated by prioritization module 460 or managing module 450 and may be updated by loading module 480 and smoothing module 490, in which various embodiments of the present disclosure may be implemented. Where transportation unit shipping data 930 covers multiple time periods, smoothing data structure 940 may be limited to the commitment time period for each lane mode in the present embodiment. Smoothing data structure 940 includes multiple data elements useful for the operations of loading module 480 and smoothing module 490. Smoothing data structure 940 includes lane 941, mode 942, time period 943, round down pointer 944A, round down priority 944B, round down number of transportation units 944C, round up pointer 945A, round up priority 945B, number of round up transportation units 945C, shipping priority score 948, and round down round up decision 949.

Entries for lane 941, mode 942 and time period 943 may be generated by managing module 450 or prioritization module 460 for every lane mode time period entry that needs a determination of a number of transportation units to commit. Additional land mode time period entries may be generated in alternative embodiments. Once the simulated loading is completed for a given lane mode time period entry by loading module 480, then the results are indicated in smoothing data set 940 through the use of pointers to the index of prioritization data set 920. For example, when loading module 480 completes the simulated loading of a land mode time period entry, such as for rounding down, then the index 921 and priority 928 of the last item loaded (or the next item available to be loaded) from prioritization data structure 920, as well as the number of transportation units simulated as loaded from Optimization data structure 930, may be provided to smoothing data set 940 as round down pointer 944A, round down priority 944B and round down number of transportation units 944C for that lane 941 mode 942 and time period 943 entry. Priority 928 could alternatively be the average or median priority of the items loaded by loading module 480. Priority Score 948 may be generated and utilized by smoothing module 490 as described above. Round down round up decision 949 includes a final decision of the whether the number of transportation units should be round down number of transportation units 944C or number of round up transportation units 945C, as may be determined by smoothing module 490. The results of this decision may also be reflected in final number of transportation units 938 of optimization data structure 930.

FIG. 9F provides a block diagram of an optimized item shipment data structure 950 which may be generated by management module 450, optimization module 470 or loading module 480 and may be updated by optimization module 470, loading module 480 and smoothing module 490, in which various embodiments of the present disclosure may be implemented. Optimized item shipment data structure 950 is an output of optimization system 430 for use in identifying which items are shipped on each time period, lane and mode. Optimized item shipment data structure 950 includes a time period 952, an item identifier 954, a quantity of the item identified for shipment 955 (i.e., for a given time period lane mode), lane 956, mode 957, and indicator 958. Entries in optimized item shipment data structure 950 may be limited to any time period lane mode needing transportation units committed for use. Indicator 958 may indicate items which were simulated for loading on transportation units previously committed in step 520 as described above.

FIG. 9G provides a block diagram of an optimized transportation unit shipment data structure 960 which may be generated by management module 450, optimization module 470 or loading module 480 and may be updated by optimization module 470, loading module 480 and smoothing module 490, in which various embodiments of the present disclosure may be implemented. Optimized transportation unit shipment data structure 960 is an output of optimization system 430 for use in identifying a quantity of transportation units for shipping units on each time period, lane and mode. Entries in optimized transportation unit shipment data structure 960 may be limited to any time period lane mode needing transportation units committed for use. Optimized transportation unit shipment data structure 960 includes a time period 962, lane 964, mode 966, and a quantity of transportation units identified for shipping items 968 (i.e., for a given time period lane mode). Quantity 968 may be an integer value or other discrete value that may be utilized to indicate a number of transportation units (e.g., half a transportation unit where half units may be utilized for shipping items).

FIG. 9H provides a block diagram of an expected inventory data structure 970 which may be generated by management module 450, optimization module 470 or loading module 480 and may be updated by optimization module 470, loading module 480 and smoothing module 490, in which various embodiments of the present disclosure may be implemented. Expected inventory data structure 970 is an output of optimization system 430 for use in identifying and expected inventory of items at each origin and source location after the shipment of items such as described in optimized item shipment data structure 950 and optimized transportation unit shipment data structure 960. Alternatively, expected inventory data structure 970 may describe such inventories just before the shipment of items such as described in optimized item shipment data structure 950 and optimized transportation unit shipment data structure 960. Expected inventory data structure 970 includes a time period 962, location 974, item identifier 976 and inventory level of that item for that location 978.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction processing device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may be processed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a special purpose machine, such that the instructions, which are processed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are processed on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more performable instructions for implementing the specified logical function(s). In some alternative implementations, the functions noted in the blocks may occur out of the order noted in the Figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or processing program code will include at least one processor coupled directly or indirectly to memory elements through a system bus. The memory elements can include local memory employed during actual processing of the program code, bulk storage media, and cache memories, which provide temporary storage of at least some program code in order to reduce the number of times code must be retrieved from bulk storage media during processing.

A data processing system may act as a server data processing system or a client data processing system. Server and client data processing systems may include data storage media that are computer usable, such as being computer readable. A data storage medium associated with a server data processing system may contain computer usable code such as for managing optimization of a network flow. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing optimization of a transportation network system comprising:
   executing code by a data processing systems to perform operations comprising:
      accessing identification of a set of items for transportation between a set of origins and a set of destinations during a set of time periods;
      accessing a set of inventory levels for each of the set of items at each of the set of origins and each of the set of destinations;
      accessing prioritization of each of the set of items for each of the time periods based on the set of inventory levels and an expected supply and demand of the set of items;
      accessing identification of a set of transportation lanes for shipping the set of items from the set of origins to the set of destinations during the set of time periods, each transportation lane including an origin from the set of the origins and a destination from the set of destinations;
      accessing a set of network constraints and costs including capacities and costs of shipping from the set of origins to the set of destinations across the transportation lanes;
      accessing a set of packing constraints for each of the set of items;
      accessing a set of loading constraints for a set of transportation units, the loading constraints limiting the quantity and placement of items for each transportation unit;
      optimizing a quantity of the set of transportation units for transporting the set of items between the set of origins and the set of destinations across the transportation lanes during the set of time periods based on the prioritization of each of the set of items, the network constraints and costs, and the set of loading constraints for each of the set of transportation units;
      identifying multiple shipping options from the optimized quantity of the set of transportation units, each shipping option including an integer quantity of transportation units for each transportation lane and time period;

training a learning system utilizing rewards and penalties to simulate loading of the transportation units with the set of items in accordance with the packing attributes for the set of items and the loading constraints for the set of transportation units;

utilizing the trained learning system to simulate loading highest priority items onto the integer quantity of transportation units for each of the multiple shipping options in accordance with the packing attributes for the set of items and the loading constraints for the set of transportation units;

generating a priority score for each of the multiple shipping options based on the prioritization of each of the set of items in each of the simulated loaded transportation units and the network constraints and costs;

selecting at least one of the multiple shipping options based on the generated priority scores for at least one transportation lane for at least one of the set of time periods;

providing the selected at least one shipping option to a predesignated data processing system;

committing a committed integer set of transportation units and an associated committed set of items for transporting items in a committed transportation lane and time period based on the provided selected shipping option;

loading the committed integer set of shipments with the set of committed set of items in a committed transportation lane and time period based on the provided selected shipping option;

retraining the trained artificial intelligence system through additional learning with a set of actual loading data of the transportation units generated after the simulated loading of the transportation units;

training an alternative artificial intelligence system utilizing rewards and penalties to simulate loading of the transportation units with the set of items in accordance with the packing attributes for the set of items and the loading constraints for the set of transportation units;

utilizing the trained alternative artificial intelligence system, in parallel with the trained learning system, to simulate loading highest priority items onto the integer quantity of transportation units for each of the multiple shipping options in accordance with the packing attributes for the set of items and the loading constraints for the set of transportation units;

determining whether the trained alternative artificial intelligence system has an improved average reward to penalty score compared to the trained learning system; and upon a positive determination, replacing the training learning system with the trained alternative artificial intelligence system in selecting at least one of the multiple shipping options based on the generated priority scores for at least one transportation lane for at least one of the set of time periods.

2. The method of claim 1 wherein the operations further comprise:

identifying a set of transportation modes for each transportation lane, each transportation mode having at least one origin and one destination;

wherein optimizing the quantity of the set of transportation units includes optimizing a quantity of the set of transportation units for each transportation mode based on the prioritization of each of the set of items, the network constraints and costs, and the set of loading constraints for each of the set of transportation modes.

3. The method of claim 1 wherein adjusting the optimized quantity of transportation units further comprises:

rounding the quantity of transportation units to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

4. The method of claim 3 wherein adjusting the optimized quantity of transportation units further comprises:

rounding the quantity of transportation units for each transportation lane to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

5. The method of claim 1 wherein the identified set of items are identified for transportation between the set of origins and the set of destinations for a specific time period; and wherein the set of network constraints and costs includes network rewards and penalties for transporting the set of items between the set of origins and the set of destinations during time periods other than the identified specific time period.

6. The method of claim 1 wherein the operations further comprise:

repeating the operations of optimizing, identifying, simulating, generating, selecting and providing while taking into account the committed integer set of transportation units and the committed set of items for the committed transportation lane and time period.

7. A computer program product for managing optimization of a transportation network system, the computer program product comprising a computer readable storage medium having program instructions embodied therewith, the program instructions processed by a processing circuit to cause the device to perform a method comprising:

accessing identification of a set of items for transportation between a set of origins and a set of destinations during a set of time periods;

accessing a set of inventory levels for each of the set of items at each of the set of origins and each of the set of destinations;

accessing prioritization of each of the set of items for each of the time periods based on the set of inventory levels and an expected supply and demand of the set of items;

accessing identification of a set of transportation lanes for shipping the set of items from the set of origins to the set of destinations during the set of time periods, each transportation lane including an origin from the set of the origins and a destination from the set of destinations;

accessing a set of network constraints and costs including capacities and costs of shipping from the set of origins to the set of destinations across the transportation lanes;

accessing a set of packing constraints for each of the set of items;

accessing a set of loading constraints for a set of transportation units, the loading constraints limiting the quantity and placement of items for each transportation unit;

optimizing a quantity of the set of transportation units for transporting the set of items between the set of origins and the set of destinations across the transportation lanes during the set of time periods based on the prioritization of each of the set of items, the network constraints and costs, and the set of loading constraints for each of the set of transportation units;

identifying multiple shipping options from the optimized quantity of the set of transportation units, each shipping option including an integer quantity of transportation units for each transportation lane and time period;

training a learning system utilizing rewards and penalties to simulate loading of the transportation units with the set of items in accordance with the packing attributes for the set of items and the loading constraints for the set of transportation units;

utilizing the trained learning system to simulate loading highest priority items onto the integer quantity of transportation units for each of the multiple shipping options in accordance with the packing attributes for the set of items and the loading constraints for the set of transportation units;

generating a priority score for each of the multiple shipping options based on the prioritization of each of the set of items in each of the simulated loaded transportation units and the network constraints and costs;

selecting at least one of the multiple shipping options based on the generated priority scores for at least one transportation lane for at least one of the set of time periods;

providing the selected at least one shipping option to a predesignated data processing system;

committing a committed integer set of transportation units and an associated committed set of items for transporting items in a committed transportation lane and time period based on the provided selected shipping option;

loading the committed integer set of shipments with the set of committed set of items in a committed transportation lane and time period based on the provided selected shipping option;

retraining the trained artificial intelligence system through additional learning with a set of actual loading data of the transportation units generated after the simulated loading of the transportation units;

training an alternative artificial intelligence system utilizing rewards and penalties to simulate loading of the transportation units with the set of items in accordance with the packing attributes for the set of items and the loading constraints for the set of transportation units;

utilizing the trained alternative artificial intelligence system, in parallel with the trained learning system, to simulate loading highest priority items onto the integer quantity of transportation units for each of the multiple shipping options in accordance with the packing attributes for the set of items and the loading constraints for the set of transportation units;

determining whether the trained alternative artificial intelligence system has an improved average reward to penalty score compared to the trained learning system; and upon a positive determination, replacing the training learning system with the trained alternative artificial intelligence system in selecting at least one of the multiple shipping options based on the generated priority scores for at least one transportation lane for at least one of the set of time periods.

8. The computer program product of claim 7 further comprising:

identifying a set of transportation modes for each transportation lane, each transportation mode having at least one origin and one destination;

wherein optimizing the quantity of the set of transportation units includes optimizing a quantity of the set of transportation units for each transportation mode based on the prioritization of each of the set of items, the network constraints and costs, and the set of loading constraints for each of the set of transportation modes.

9. The computer program product of claim 7 wherein adjusting the optimized quantity of transportation units further comprises:

rounding the quantity of transportation units to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

10. The computer program product of claim 9 wherein adjusting the optimized quantity of transportation units further comprises:

rounding the quantity of transportation units for each transportation lane to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

11. The computer program product of claim 7 wherein the identified set of items are identified for transportation between the set of origins and the set of destinations for a specific time period; and wherein the set of network constraints and costs includes network rewards and penalties for transporting the set of items between the set of origins and the set of destinations during time periods other than the identified specific time period.

12. The computer program product of claim 7 further comprising:

repeating the operations of optimizing, identifying, simulating, generating, selecting and providing while taking into account the committed integer set of transportation units and the committed set of items for the committed transportation lane and time period.

13. A data processing system for managing optimization of a transportation network system, the data processing system comprising:

a processor; and a memory storing program instructions which when processed by the processor perform the steps of:

accessing identification of a set of items for transportation between a set of origins and a set of destinations during a set of time periods;

accessing a set of inventory levels for each of the set of items at each of the set of origins and each of the set of destinations;

accessing prioritization of each of the set of items for each of the time periods based on the set of inventory levels and an expected supply and demand of the set of items;

accessing identification of a set of transportation lanes for shipping the set of items from the set of origins to the set of destinations during the set of time periods, each transportation lane including an origin from the set of the origins and a destination from the set of destinations;

accessing a set of network constraints and costs including capacities and costs of shipping from the set of origins to the set of destinations across the transportation lanes;

accessing a set of packing constraints for each of the set of items;

accessing a set of loading constraints for a set of transportation units, the loading constraints limiting the quantity and placement of items for each transportation unit;

optimizing a quantity of the set of transportation units for transporting the set of items between the set of origins and the set of destinations across the transportation lanes during the set of time periods based on the prioritization of each of the set of items, the network constraints and costs, and the set of loading constraints for each of the set of transportation units;

identifying multiple shipping options from the optimized quantity of the set of transportation units, each shipping option including an integer quantity of transportation units for each transportation lane and time period;

training a learning system utilizing rewards and penalties to simulate loading of the transportation units with the set of items in accordance with the packing attributes for the set of items and the loading constraints for the set of transportation units;

utilizing the trained learning system to simulate loading highest priority items onto the integer quantity of transportation units for each of the multiple shipping options in accordance with the packing attributes for the set of items and the loading constraints for the set of transportation units;

generating a priority score for each of the multiple shipping options based on the prioritization of each of the set of items in each of the simulated loaded transportation units and the network constraints and costs;

selecting at least one of the multiple shipping options based on the generated priority scores for at least one transportation lane for at least one of the set of time periods;

providing the selected at least one shipping option to a predesignated data processing system;

committing a committed integer set of transportation units and an associated committed set of items for transporting items in a committed transportation lane and time period based on the provided selected shipping option;

loading the committed integer set of shipments with the set of committed set of items in a committed transportation lane and time period based on the provided selected shipping option;

retraining the trained learning system through additional learning with a set of actual loading data of the transportation units generated after the simulated loading of the transportation units;

training an alternative artificial intelligence system utilizing rewards and penalties to simulate loading of the transportation units with the set of items in accordance with the packing attributes for the set of items and the loading constraints for the set of transportation units;

utilizing the trained alternative artificial intelligence system, in parallel with the trained learning system, to simulate loading highest priority items onto the integer quantity of transportation units for each of the multiple shipping options in accordance with the packing attributes for the set of items and the loading constraints for the set of transportation units;

determining whether the trained alternative artificial intelligence system has an improved average reward to penalty score compared to the trained learning system; and upon a positive determination, replacing the training learning system with the trained alternative artificial intelligence system in selecting at least one of the multiple shipping options based on the generated priority scores for at least one transportation lane for at least one of the set of time periods.

14. The data processing system of claim 13 further comprising:

identifying a set of transportation modes for each transportation lane, each transportation mode having at least one origin and one destination;

wherein optimizing the quantity of the set of transportation units includes optimizing a quantity of the set of transportation units for each transportation mode lane based on the prioritization of each of the set of items, the network constraints and costs, and the set of loading constraints for each of the set of transportation modes.

15. The data processing system of claim 13 wherein adjusting the optimized quantity of transportation units further comprises:

rounding the quantity of transportation units to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

16. The data processing system of claim 15 wherein adjusting the optimized quantity of transportation units further comprises:

rounding the quantity of transportation units for each transportation lane to a first discrete quantity of transportation units and a second discrete quantity of transportation units, the second discrete quantity of transportation units larger than the first discrete quantity of transportation units; and selecting the quantity of transportation units from the first discrete quantity and the second discrete quantity based on the prioritization of each of the set of items and the network constraints and costs.

17. The data processing system of claim 13 wherein the identified set of items are identified for transportation between the set of origins and the set of destinations for a specific time period; and wherein the set of network constraints and costs includes network rewards and penalties for transporting the set of items between the set of origins and the set of destinations during time periods other than the identified specific time period.

18. The data processing system of claim 13 further comprising:
   repeating the operations of optimizing, identifying, simulating, generating, selecting and providing while taking into account the committed integer set of transportation units and the committed set of items for the committed transportation lane and time period.

19. The method of claim 1 further comprising:
   accessing a previously committed integer set of transportation units and an associated previously committed set of items;
   after prioritizing the set of items, utilizing the trained learning system to simulate loading of the previously committed integer set of transportation units with the associated committed set of items and with a subset of the set of items with the highest priority for the day and lane of the committed integer set of transportation units in accordance with the packing attributes for the set of items and the loading constraints for the set of transportation units; and
   prior to optimizing a quantity of the set of transportation units for transporting the set of items between the set of origins and the set of destinations across the transportation lanes during the set of time periods based on the prioritization of each of the set of items, redacting the committed integer set of transportation units from the set of transportation units and redacting the previously committed set of items and the subset of the identified set of items with the highest priority from the set of item.

20. The method of claim 19 wherein the packing attributes for the set of items includes pallet size, weight and crushability; and wherein the loading constraints for the set of transportation units includes weight, volume and balancing requirements.

21. The computer program product of claim 7 further comprising:
   accessing a previously committed integer set of transportation units and an associated previously committed set of items;
   after prioritizing the set of items, utilizing the trained learning system to simulate loading of the previously committed integer set of transportation units with the associated committed set of items and with a subset of the set of items with the highest priority for the day and lane of the committed integer set of transportation units in accordance with the packing attributes for the set of items and the loading constraints for the set of transportation units; and
   prior to optimizing a quantity of the set of transportation units for transporting the set of items between the set of origins and the set of destinations across the transportation lanes during the set of time periods based on the prioritization of each of the set of items, redacting the committed integer set of transportation units from the set of transportation units and redacting the previously committed set of items and the subset of the identified set of items with the highest priority from the set of item.

22. The computer program product of claim 21 wherein the packing attributes for the set of items includes pallet size, weight and crushability; and wherein the loading constraints for the set of transportation units includes weight, volume and balancing requirements.

23. The data processing system of claim 13 further comprising:
   accessing a previously committed integer set of transportation units and an associated previously committed set of items;
   after prioritizing the set of items, utilizing the trained learning system to simulate loading of the previously committed integer set of transportation units with the associated committed set of items and with a subset of the set of items with the highest priority for the day and lane of the committed integer set of transportation units in accordance with the packing attributes for the set of items and the loading constraints for the set of transportation units; and
   prior to optimizing a quantity of the set of transportation units for transporting the set of items between the set of origins and the set of destinations across the transportation lanes during the set of time periods based on the prioritization of each of the set of items, redacting the committed integer set of transportation units from the set of transportation units and redacting the previously committed set of items and the subset of the identified set of items with the highest priority from the set of item.

24. The data processing system of claim 23 wherein the packing attributes for the set of items includes pallet size, weight and crushability; and wherein the loading constraints for the set of transportation units includes weight, volume and balancing requirements.

* * * * *